US012583005B2

(12) United States Patent
Andreev et al.

(10) Patent No.: US 12,583,005 B2
(45) Date of Patent: Mar. 24, 2026

(54) DOSING DEVICE, CONTAINER, PRODUCT DISPENSER AND SYSTEM

(71) Applicant: LIQIX TECHNOLOGIES GMBH, Hamburg (DE)

(72) Inventors: Maxim Andreev, Hamburg (DE); Ferdinand Yussupov, Winsen (DE)

(73) Assignee: LIQIX TECHNOLOGIES GMBH, Hamburg (DE)

( * ) Notice: Subject to any disclaimer, the term of this patent is extended or adjusted under 35 U.S.C. 154(b) by 222 days.

(21) Appl. No.: 18/285,903

(22) PCT Filed: Apr. 8, 2022

(86) PCT No.: PCT/DE2022/100271
§ 371 (c)(1),
(2) Date: Oct. 6, 2023

(87) PCT Pub. No.: WO2022/218473
PCT Pub. Date: Oct. 20, 2022

(65) Prior Publication Data
US 2024/0189848 A1 Jun. 13, 2024

(30) Foreign Application Priority Data

Apr. 12, 2021 (DE) ..................... 10 2021 001 872.9
Feb. 4, 2022 (DE) ..................... 10 2022 102 725.2

(51) Int. Cl.
*B05B 11/10* (2023.01)
*B05B 11/00* (2023.01)
*B05B 11/02* (2023.01)

(52) U.S. Cl.
CPC ...... *B05B 11/1033* (2023.01); *B05B 11/0075* (2013.01); *B05B 11/026* (2023.01); *B05B 11/1032* (2023.01)

(58) Field of Classification Search
CPC ............. B05B 11/1033; B05B 11/1075; B05B 11/026; B05B 11/1032; B05B 11/0067; B05B 11/1094
See application file for complete search history.

(56) References Cited

U.S. PATENT DOCUMENTS 6,244,472 B1 * 6/2001 Hennemann ...... B05B 11/00444 222/189.09
7,806,301 B1 10/2010 Ciavarella et al.
8,038,034 B2 10/2011 Pelfrey
(Continued)

OTHER PUBLICATIONS

International Search Report for PCT/DE2022/100271 mailed Aug. 8, 2022.

*Primary Examiner* — Vishal Pancholi
(74) *Attorney, Agent, or Firm* — Carlson, Gaskey & Olds, P.C.

(57) ABSTRACT

A metering pump for integration into a container includes a pump housing having a pump chamber, a pump inlet, and a pump outlet. The pump chamber is defined by a pump chamber base and an elastically deformable pump dome. The pump housing is composed of at least a first pump housing portion and a second pump housing portion. The pump dome is a part of the first pump housing portion and the pump chamber base is a part of the second pump housing portion. In one example, a container includes the metering pump and an associated product dispenser.

23 Claims, 23 Drawing Sheets

(56) References Cited

U.S. PATENT DOCUMENTS

| | | | |
|---|---|---|---|
| 9,283,582 B2 * | 3/2016 | Han de Man ......... B05B 11/007 | |
| 10,226,783 B2 | 3/2019 | Han de Man et al. | |
| 10,525,492 B2 | 1/2020 | Ezzina et al. | |
| 10,654,059 B2 | 5/2020 | LaFlamme et al. | |
| 2005/0260090 A1 | 11/2005 | Stark et al. | |
| 2006/0186139 A1 * | 8/2006 | Laidler ............... B05B 11/1084 222/207 | |
| 2014/0252033 A1 | 9/2014 | Murray | |
| 2018/0369843 A1 * | 12/2018 | Ezzina ................ B05B 11/1097 | |
| 2020/0225071 A1 | 7/2020 | LaFlamme et al. | |

* cited by examiner

DOSING DEVICE, CONTAINER, PRODUCT DISPENSER AND SYSTEM

CROSS-REFERENCE TO RELATED APPLICATIONS

This application is the US national phase of PCT/DE2022/100271, which was filed on Apr. 8, 2022 claiming the benefit of German Application No. 10 2021 001 872.9, filed on Apr. 12, 2021, and German Application No. 10 2022 102 725.2, filed on Apr. 2, 2022, which is incorporated herein by reference in its entirety.

TECHNICAL FIELD

The present disclosure relates to a dosing device for liquid products and flowable products, a container with an integrated dosing device, and a product dispenser that can be equipped with a container of the aforementioned type. The present disclosure further relates to a system comprising a product dispenser and at least one corresponding container.

BACKGROUND

Liquid and flowable products or substances and substance mixtures include, in particular, low-viscosity to high-viscosity liquids or liquid mixtures and viscoelastic materials. In the context of a non-exhaustive list, emulsions, suspensions and dispersions shall be mentioned alongside solutions. The products mentioned may, for example, be liquids, gels, creams, ointments or lotions for personal care and/or cleansing, pharmaceuticals, technical liquids, oils and fats or the like.

For storage, transport, sale and use, liquid or flowable products are usually kept in a container, sales packaging or transport packaging. In this context, a large number of different types of containers and packagings have been developed in the past. Bottles, cans, tubes, canisters, containers and composite cartons etc. are just a few examples.

If a more precise metering of the liquid or flowable product is necessary or desired, the aforementioned containers can often be equipped with a screw-on pump lid with a stroke pump, a pipette or another metering device.

Commercially available bottles with dosing devices often consist of a large number of components which have to be assembled in a complex process and which are difficult to recycle, especially not completely, because of the different materials used (e.g. components made of different plastics together with components made of metal, such as springs, etc.).

Throughout the product lifecycle, this results in high material and energy consumption and high CO2 emissions.

Film pouches are nowadays considered the most cost effective and one of the most environmentally friendly packaging options for liquid and flowable products. Film pouches have been known for many years, but were rather unpopular due to their poor handling and high susceptibility to mechanical damage.

In the meantime, film pouches are once again experiencing a certain popularity, for example, as stand-up pouches, spout bags, flat pouches and gusseted pouches.

However, one disadvantage of film pouches, especially film pouches with a tear-off edge, is their lack of resealability. In addition to the obvious disadvantage that such already opened film pouches are difficult to transport, the contents of the opened film pouch are also exposed to an increased risk of e.g. hygienically compromising contamination and microbial infestation as well as faster oxidation.

Film pouches with a welded-in reclosable nozzle, also known as a spout, at least partially alleviate the problem described above. However, they lack reproducible metering capability, which severely limits the potential applications of the film pouches.

Although previously known metering pumps overcome this drawback, they consist of a large number of components and therefore cannot be used economically for packaging cheap mass-produced products.

SUMMARY

A dispenser for liquid and flowable products is provided, which is improved in particular in the above-mentioned aspects and which has a low complexity, a simple and efficient manufacturability with a low material consumption, as well as a good recyclability. Furthermore, the disclosure is based on the objective of providing a container, an associated product dispenser, and a system comprising the container and the product dispenser.

A metering pump having the features of claim 1, a container having the features of claim 13, a product dispenser having the features of claim 14, and a system having the features of claim 15 are proposed to solve the above objectives.

It should be noted that the features individually listed in the claims may be combined with one another in any technically useful manner and indicate further embodiments of the disclosure. The description further characterizes and specifies the disclosure, particularly in conjunction with the figures. In addition, the features described in context of the metering pump can be advantageous embodiments of the container or the system, and vice versa.

It should also be noted that any conjunction "and/or" used herein that stands between two features and links them together should always be interpreted such that in a first embodiment only the first feature is present, in a second embodiment only the second feature is present, and in a third embodiment both the first and second features are present.

As mentioned, the present disclosure relates to a dosing device, hereinafter also referred to as a metering pump, for integration into a container.

The metering pump comprises a pump housing having a pump chamber. The pump housing further comprises a pump inlet and a pump outlet. The pump chamber is bounded by a pump chamber base and an elastically deformable pump dome.

If the elastically deformable pump dome is depressed during operation of the metering pump while the fluid connection from the pump inlet to the pump chamber is closed, fluid is delivered from the pump chamber to the pump outlet or rather out of the pump outlet, due to the reduction in volume in the pump chamber. The fluid connection can be closed, for example, by covering the pump inlet with a container wall (or film) that is in contact with the metering pump when the pump dome is pressed in. Alternatively or additionally, a non-return valve, often also referred to as a check valve, can be provided in the fluid connection between the pump inlet and the pump chamber.

As soon as the pump dome then elastically returns to its original state, the pump chamber fills up again with fluid, which flows in from the direction of the pump inlet or rather is sucked in from there.

The pump chamber base can be rigid, i.e. inflexible, or in some embodiments, it can also be flexible. Advantageously, the pump housing is thin-walled. In this context, a pump housing is considered "thin-walled" if the predominant part (>50%) of the surface, in particular in areas of homogeneous wall thickness, has material thicknesses of less than 3 mm, in particular less than 1.5 mm, preferably less than 0.8 mm.

The pump housing can be joined from a first pump housing portion and a second pump housing portion. The pump dome is then a portion of the first pump housing portion and the pump chamber base is a portion of the second pump housing portion.

A metering pump as previously described can be manufactured particularly easily and efficiently in few steps. The material consumption is very low. In addition to the price, this also reduces energy consumption, $CO_2$ emissions and plastic waste compared to other packaging solutions with more complex dosing devices.

The metering pump according to the disclosure allows for the economical packaging of fluid bulk products. Thus, it expands the possible applications of thin-walled containers, in particular film pouches. In this context, a film pouch with integrated metering pump according to the disclosure can be a cheaper and more ecological alternative to the commercially available bottles equipped with a metering device in various sectors of the fluid-like products industry. A metering pump integrated into the container is also particularly advantageous from a hygienic point of view.

Further advantageous embodiments of metering pumps according to the disclosure can be derived from the features indicated in the dependent claims as well as from the features described below. It should be emphasized at this point that the features described below may also be advantageous features of a container, product dispenser or resulting system according to the disclosure. In order to avoid repetition, the features in question will generally only be described in relation to the metering pump according to the disclosure.

Preferably, the first pump housing portion and the second pump housing portion are formed together as an integral part and are connected by a film hinge. Advantageously, the integral component has no undercuts in a defined demolding direction extending from the parting plane of the injection molds. On the one hand, this aspect greatly simplifies the manufacturing process and the tools required. It also simplifies handling of the semi-finished product, since the integral part only needs to be folded over at the film hinge. The relative positioning of the first and second pump housing sections is also simplified. At the same time, the number of parts to be handled is reduced.

The first pump housing portion and the second pump housing portion may comprise or be made of a thermoplastic material and may be welded at a joint area. Laser transmission welding or ultrasonic welding, for example, are particularly suitable for this purpose. Thermoplastics are readily and inexpensively available, are very easy to recycle, and have very suitable material properties for the application.

The metering pump can therefore be made entirely of a flexible plastic material using plastic injection molding, vacuum pressing, thermoforming, or other suitable processes.

In some embodiments, the first pump housing portion and the second pump housing portion have congruent alignment geometries. For example, these may include centering pins or centering cones and corresponding holes, or a circumferential groove and a corresponding tongue. This facilitates precise alignment of the pump housing portions.

According to an advantageous aspect, the metering pump comprises an outlet valve. The outlet valve is arranged in a fluid connection from the pump chamber to the pump outlet and is configured as a non-return valve. On the one hand, a non-return valve between the pump chamber and the pump outlet supports the efficiency of the pump. On the other hand, however, it also prevents ambient air from being drawn into the fluid connection and/or the pump chamber. This is beneficial from a hygienic standpoint and can extend the expiry after open of a product being dispensed with the metering pump.

The outlet valve may comprise an occlusion part having a convex sealing surface and a corresponding sealing seat to the occlusion part. Preferably, the occlusion part may be an integral part of the first or the second pump housing portion and the sealing seat may accordingly be an integral part of the respective other pump housing portion, i.e. the second or the first pump housing portion, respectively. Unexpectedly, it has been found that this type of valve is particularly suitable for the present application.

Preferably, the occlusion part of the outlet valve may comprise an annular sealing corrugation around the convex sealing surface. Optionally, the sealing seat of the outlet valve may further comprise an annular ridge corresponding to the sealing corrugation. When the outlet valve is closed, the ridge abuts the sealing corrugation of the occlusion part at least on one side and preferably on both sides.

Furthermore, the outlet valve may have a bead on the outside surrounding the outlet valve opening and an outlet ring channel disposed around the bead. When the pump dome returns to its initial position after being pushed in, thereby increasing the chamber volume and creating a vacuum, the vacuum can draw in the film of a film pouch surrounding the metering pump, thereby closing the pump outlet.

The metering pump may include a further non-return valve in the fluid connection from the pump chamber to the pump outlet. In particular, the additional non-return valve may be an additional non-return valve connected in series in fluid communication with the outlet valve. Multiple sequential sealing levels increase the reliability of the seal. This reduces the risk of inadvertent leakage of fluid from the metering pump or container or inadvertent leakage of air into the container. The other non-return valve can be a second outlet valve. The second outlet valve can be similar in design to the first outlet valve.

In at least some embodiments, the pump dome may include a so-called decompression crown. The decompression crown comprises a plurality of decompression teeth shaped and spaced in an annular manner around the pump inlet such that two adjacent decompression teeth form a respective decompression channel therebetween. Decompression teeth are elevations/protrusions of the outer surface of the pump dome, which are of such height and having such small radii that gaps are formed between the pump dome and the container wall/foil surrounding the metering pump. Pressure equalization can occur at any time via the decompression channels, even when the film/wall of the surrounding film pouch/container is directly adjacent to the pump dome.

According to another advantageous aspect, the pump dome may comprise at least one circumferential and preferably several concentrically arranged spring corrugations. The spring corrugations may have a thinner material thickness than the remainder of the pump dome. The spring corrugations improve the tactile/haptic sink-in characteristics of the pump dome.

In some embodiments, the pump dome can have a plurality of decompression teeth. The decompression teeth may be arranged on the pump dome at regular intervals. In other words, the surface of the pump dome can be knobbed, for example.

The pump inlet can be centered in the pump dome. In these variants, the pump inlet is covered by the container wall/foil when the pump dome is pressed in. This eliminates the need for a separate inlet valve as a non-return valve.

Alternatively, the pump inlet can be located outside the pump chamber. In this case, the metering pump has an inlet valve that is located in a fluid connection from the pump inlet to the pump chamber and is designed as a non-return valve.

The non-return valve in the fluid connection between the pump inlet and the pump chamber ensures that the liquid or flowable product is delivered in the correct direction.

In addition, the pump chamber base may have one or more stiffening beads to increase rigidity.

According to a further advantageous aspect, the pump housing may comprise one or more grooves arranged and configured to form, at least in sections, a fluid connection between the pump inlet and the pump chamber and/or between the pump chamber and the pump outlet. In the area (on both sides) of the groove, the container wall/foil may be bonded, in particular welded, to the pump housing. The container wall/foil then forms the remaining wall of the fluid channel.

In addition, the pump housing may have at least one fastening portion for engaging a snap connection. The fastening portion may comprise a latching tab, a latching lug and/or an edge for engaging from behind, and preferably a further edge for positioning.

According to another advantageous aspect, the pump housing may comprise at least one bacteriostatic, bactericidal or fungicidal element, preferably disposed in the fluid connection from the pump chamber to the pump outlet.

In some embodiments, the metering pump may include a leak prevention device. The leak prevention device is adapted to seal a fluid connection between the pump chamber and the pump outlet. The leak prevention device is configured to be removed, released, or mechanically destroyed by a user to unseal the fluid connection.

The above-described metering pump is intended to be arranged in a thin-walled container and welded to the container.

The present disclosure also relates to such a container with an integrated metering pump.

Preferably, the container and the metering pump are made of the same or at least a similar thermoplastic material.

The containers may be film pouches. Alternatively, the container may be a thin-walled plastic container in which the wall has a material thickness that is so stiff that it is no longer commonly understood to be a film (for example, a wall thickness of about 0.3 mm or more), but comprises at least locally defined flexible regions. The flexible regions may be provided, for example, by hinge corrugations having a reduced wall thickness.

According to a further advantageous aspect, the container is suitable for dispensing fluid-like products from fields such as perfumery, cosmetics, pharmaceuticals, hygiene, personal care, home care, food (esp. beverages and dairy products), nutritional supplements, technology and other fields.

The containers can be, if they are foil bags, sealed edge bags, doypack, flowpack, flat bags, tubular bags with Euro slot, bag chains, contour bags, gusset bags, bag-in-box bags, easy pack, block-bottom bags as well as other types of film pouches. Alternatively, containers may be made of thin-walled plastic, but too strong to qualify as film. Containers of this type then have elastic areas, for example having elastic areas comprising hinge corrugations.

Further proposed is a product dispenser for receiving a container with a metering pump as described above, the product dispenser having holding elements for fastening the container and a flexibly mounted push pin for manual actuation of the metering pump and/or an actuator seat for receiving a motor-driven actuator for automatic actuation of the metering pump. By using such a product dispenser, rather disadvantageous properties of a film pouch, in particular the relatively low inherent stability, can be compensated.

A corresponding system comprises a product dispenser and a container with a metering pump, as previously described. Optionally, the system may further comprise a motor-driven actuator for automatically actuating the metering pump in the container. The actuator can be integrated into the product dispenser in a simple manner.

BRIEF DESCRIPTION OF THE DRAWINGS

Further features and advantages of the disclosure will be apparent from the following description of non-limiting embodiments of the disclosure, which will be explained in more detail with reference to the drawings. In these drawings schematically show.

DETAILED DESCRIPTION

In order to avoid unnecessary repetition, identical or similarly functioning parts—even across different embodiments—are provided with the same reference signs and are described only once, unless their function and effect is already clearly apparent from the above description in conjunction with the figures. Consequently, the differences between the embodiments will be particularly emphasized below.

Figures 1A, 1B, 1C:
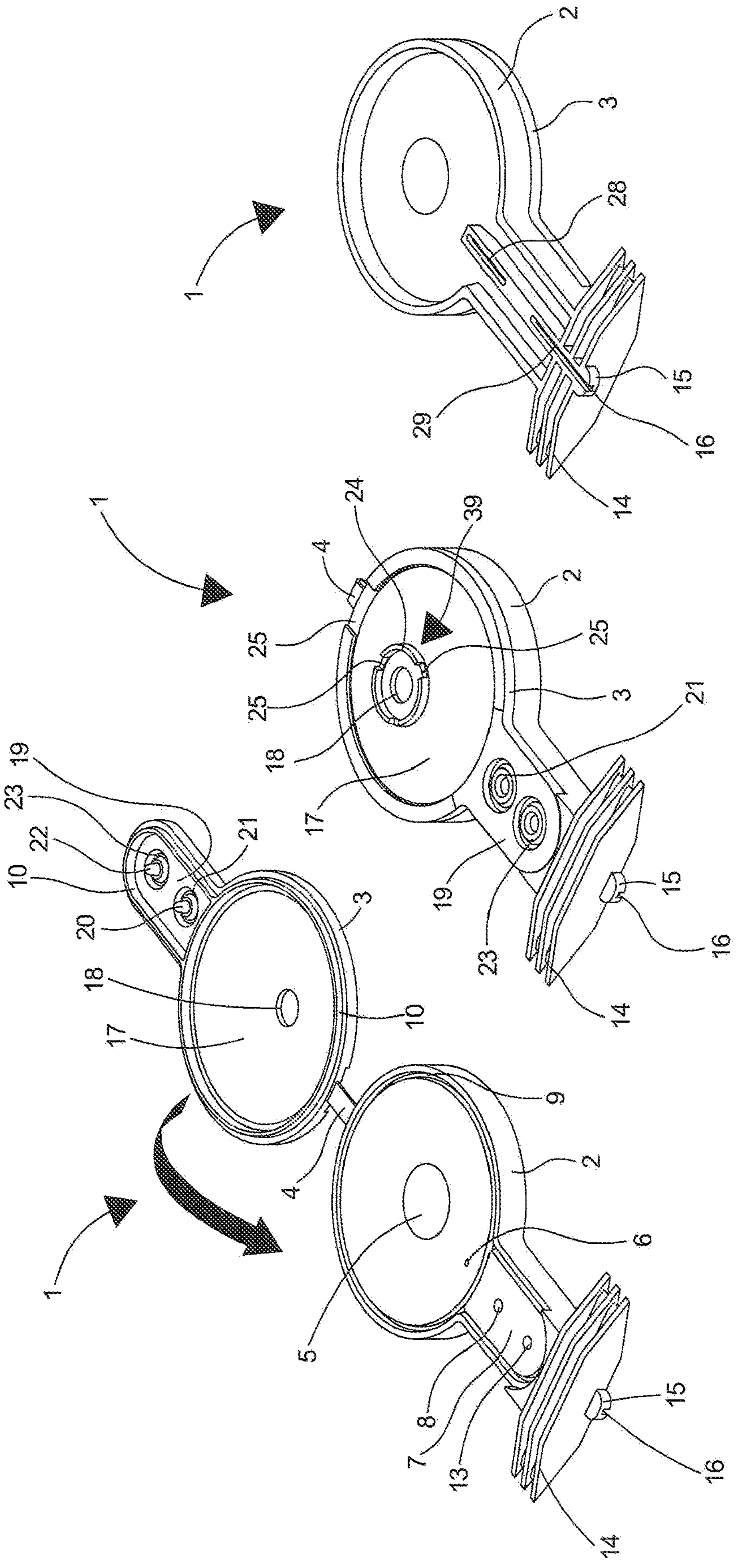
FIGS. 1A, 1B, 1C show a metering pump according to a first embodiment, respectively in an unassembled open state, in an assembled closed state from above, and in an assembled closed state from below.

FIG. 1 shows a metering pump 1, which is shown in FIG. 1A in the open, unassembled state. Here, all elements of the metering pump 1 are designed and arranged without undercuts in such a way that the metering pump can be manufactured in one piece (as an integral part) in a two-part plastic injection mold. The dosing pump 1 includes the base part 2 (also referred to as the second part of the pump housing) and the upper part 3 (also referred to as the first part of the pump housing), which are connected to each other by a connecting element 4, such as a film hinge for example.

The base part 2 comprises a pump chamber base 5, in which the first outlet channel 28 also opens into an outlet channel opening 6, and a valve chamber base 7, in which two through holes with associated sealing or valve seats 8, 13 are arranged. The outer valve seat in the fluid connection can also be referred to as the outlet valve seat 13. The inner (pump chamber side) valve seat is also referred to as the air valve seat 8. Grooves 9 surround the pump chamber base 5 and the valve chamber base 7 so as to form two separate and closed contours.

A foot 14 of the metering pump 1, which is to be welded to a container/foil bag 100 on the inside, is arranged in a front region of the base 2. The foot 14 has on its outer surface the dispensing console 15, which is a kind of protrusion or beak, and the dispensing opening 16, from which the fluid product is dispensed.

The upper part 3 of the illustrated metering pump 1 comprises the pump diaphragm 17 (hereinafter also referred to as pump dome) in which a fill opening 18 (also referred to as pump inlet) is arranged at its center. Furthermore, the upper part 3 comprises, in a position corresponding to the valve chamber base 7 in the base part 2, the valve chamber cover 19 in which an air valve (or, more precisely, an occluding part 20 of a second outlet valve 35) supported in an air valve diaphragm 21 and an outlet valve (or, more precisely, an occluding part 22 of a first outlet valve 34) supported in an outlet valve diaphragm are formed. The tongue 10 thereby surrounds the pump diaphragm 17 as well as the valve chamber cover 19 in such a way that two separate closed contours are formed, which repeat the contours of the groove 9 of the base part 2.

Figure 3A:
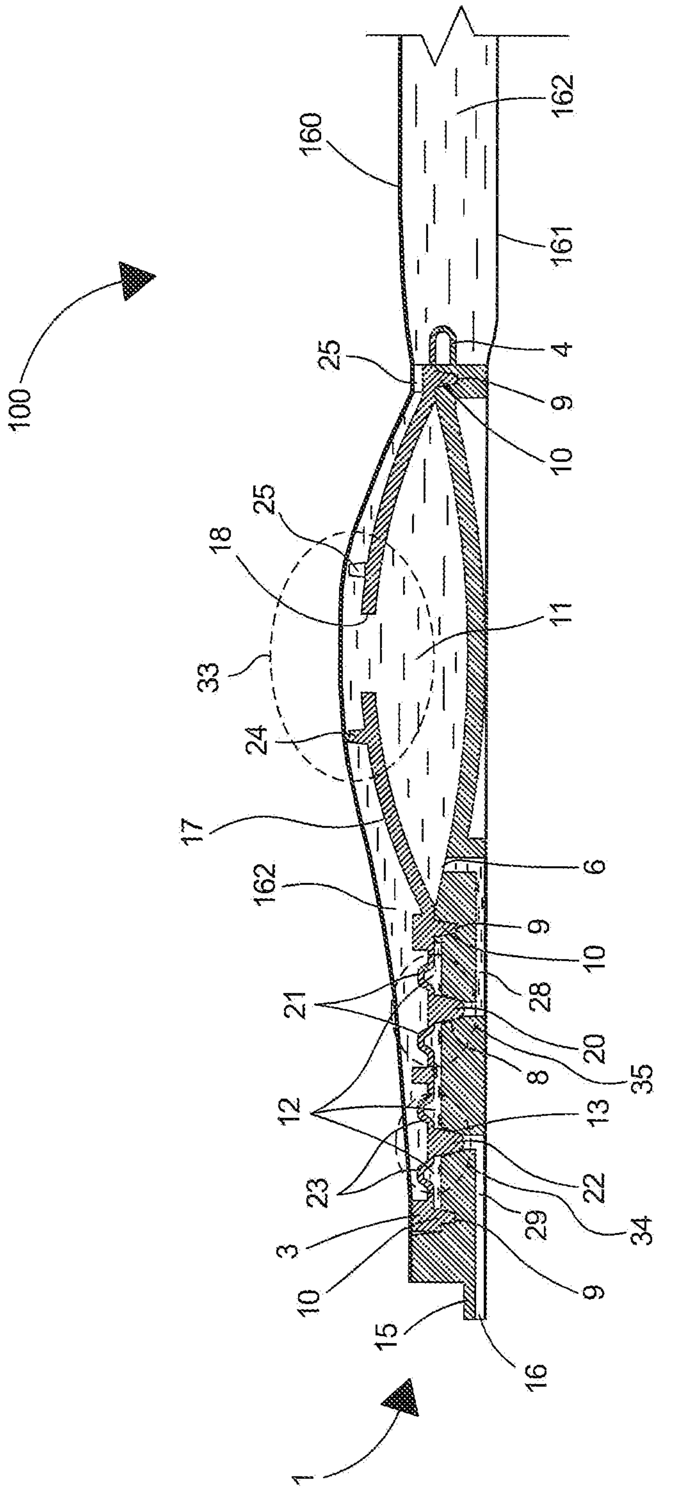
FIGS. 3A, 3B, 3C show the metering pump of FIGS. 1A to 1C in the film pouch of FIGS. 2A, 2B, respectively in an unactuated state, in an actuated state, and in a post-actuated state.
Figure 3B:
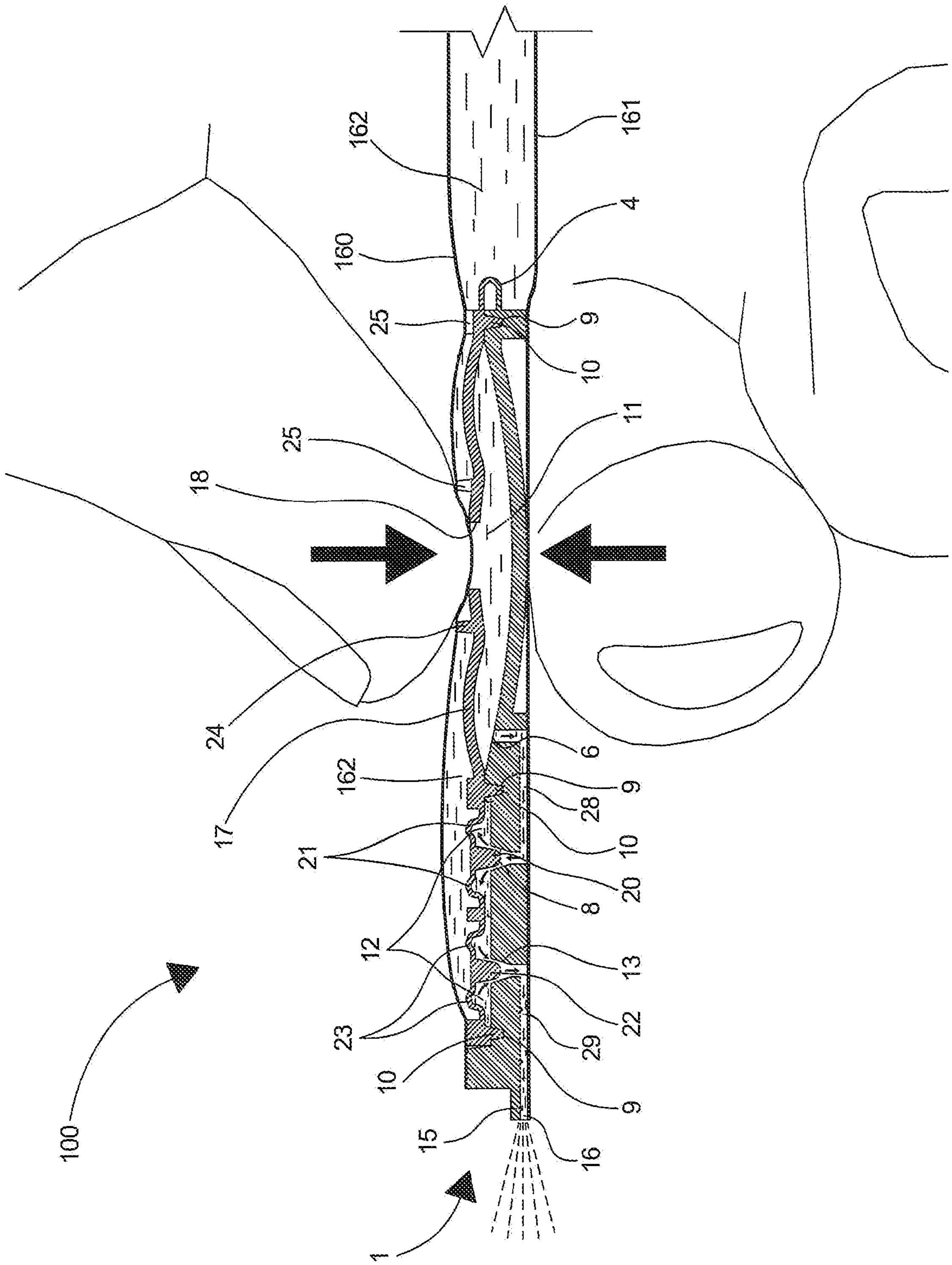
Figure 3C:
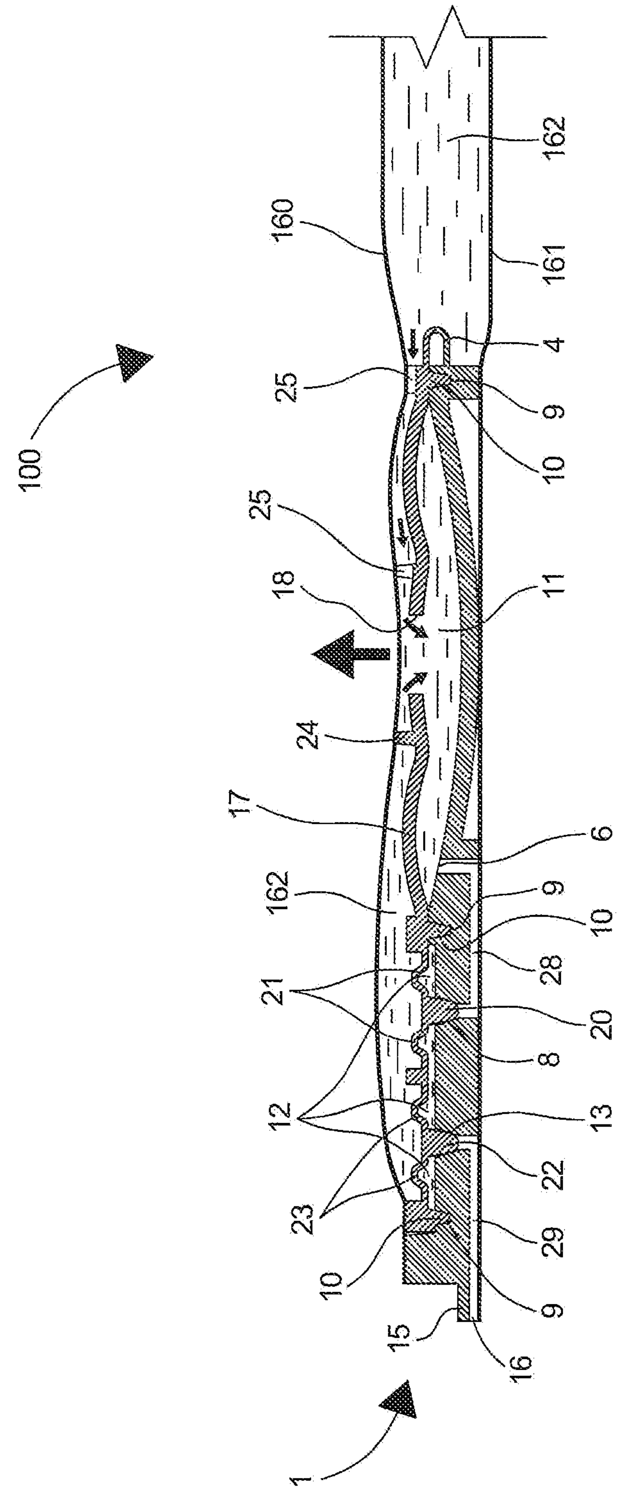

FIG. 1B shows the metering pump 1 in the assembled state, the upper part 3 being fixed to the base part 2 by the connection of the tongue 10 and the groove 9. Thereby, the occluding part 20 is seated in the air valve seat 8 and the occluding part 22 is seated in the outlet valve seat 13. The material connection of the groove 9 with the tongue 10 is made by an ultrasonic, laser, or heat welding process or by another type of joining such as form-locking. As a result of joining the groove 9 to the tongue 10, two volumes are formed, namely the pump chamber 11 and the valve chamber 12 (for example, as shown in FIGS. 3A, 3B and 3C). The outside of the pump diaphragm 17 further comprises a decompression crown 39 surrounding the fill opening 18 (hereinafter also referred to as the pump inlet). The decompression crown has flow gaps 25 between the individual decompression teeth 24, which are spaced apart from each other. In addition, welding areas 26 are provided at the edges of the pump diaphragm 17 at which the pump diaphragm 17 is welded to the top film 160 of the film pouch 100. At least one additional flow gap 25 is further provided at the rear end of the metering pump 1 to allow unobstructed flow of fluid from the main bag volume 162 toward the fill opening 18.

FIG. 1C shows the underside of the metering pump 1, including the first outlet channel 28, which is a fluid connection connecting the outlet channel opening 6 of the pump chamber 11 to the air valve seat 8, and the second outlet channel 29, which is connected at one end to the outlet valve seat 13 and at the other end to the dispensing opening 16 (see FIG. 3).

Although the dispensing opening is shown as a simple drip opening, a sponge or brush attachment can be provided in its place. This can be used to apply the liquid or flowable product to surfaces for cleaning or coating purposes.

Alternatively, the dispensing opening 16 may be configured as a spray nozzle 32. This may be used, for example, to apply the liquid-like product as a spray mist to large surfaces, such as a disinfectant solution or a solution for medical or technical applications.

FIG. 2 shows the metering pump 1 being welded into a film pouch 100. Welding areas 126 of the film pouch 100 are shown being dotted. The welding areas 126 of the film pouch correspond to the welding areas of the metering pump 1.

Figure 2B:
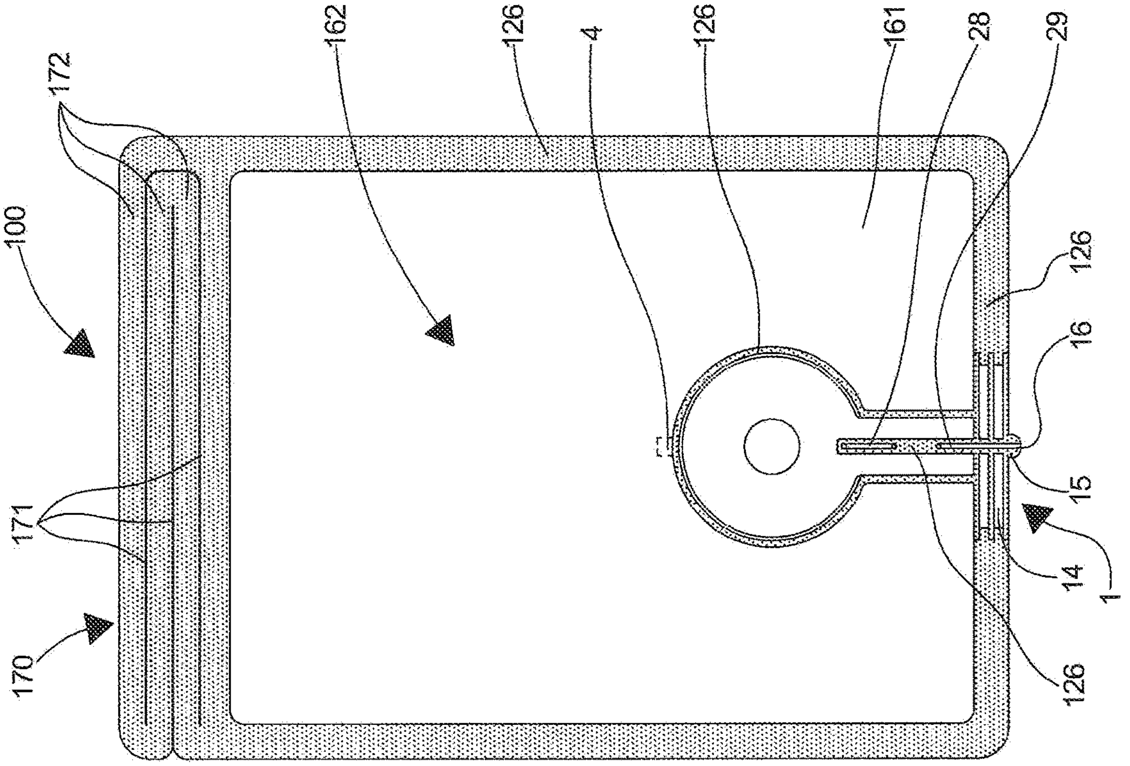
FIGS. 2A, 2B show a film pouch according to a first embodiment with the metering pump of FIGS. 1A to 1C, shown from the front and from the back.
Figure 2A:
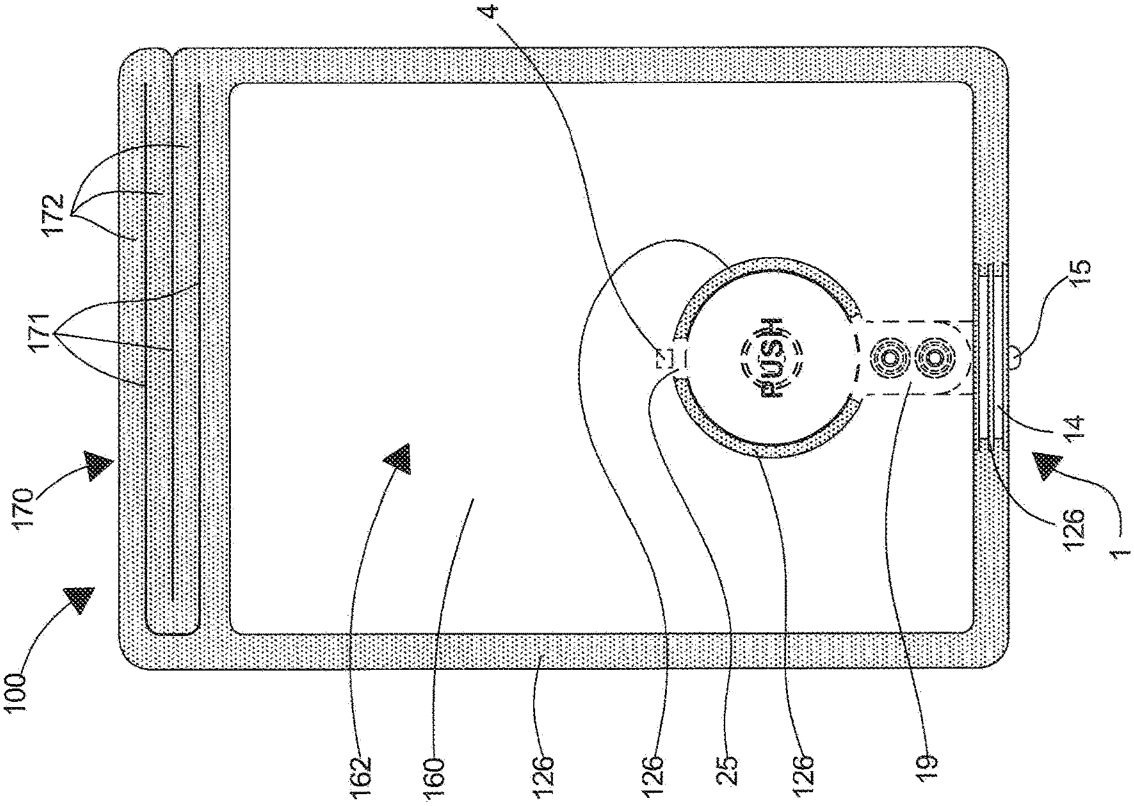

FIG. 2A shows the front side of the film pouch 100. The metering pump 1 is welded inside the film pouch 100, namely between the upper film 160 and the lower film 161. Thereby, the upper film 160 and lower film 161 are bonded at the welding areas 126 to the foot 14 of the metering pump. The dispensing console 15 is arranged outside the film pouch 100. Island-shaped welding areas 126 are arranged along the circumference of the pump diaphragm 17, which spot-weld the upper film 160 to the upper part 3 of the metering pump 1. Decompression channels are formed in the area between the welds.

In FIG. 2B, the rear side of the film pouch 100 is shown. It can be seen that the welding areas 126 are formed along the periphery of the base 2, along the periphery of the first outlet channel 28 and the periphery of the second outlet channel 29, and are connected to the welding area 26 of the foot 14 and to the welding area 126 at the edge of the film pouch 100. In this way, the first outlet channel 28 and the second outlet channel 29 are separated from the bag main volume 62. As such, the bottom film 61 serves as a wall for the first outlet channel 28 and the second outlet channel 29.

Optionally, the film pouch 100 may form a mount 170 in the welding area 26 as shown. For this purpose, tear lines or perforations are implemented in the welded area, dividing the welded area into a (meandering) mounting strap 172. In order to use the mount 170, the mounting strap 172 is (manually) detached along the tear lines 171, thereby forming a loop. This allows the film pouch 100 to be attached to, for example, clothing or other items. The length of the loop depends on the number of turns of the mounting strap.

Furthermore, the film pouch 100 may also comprise holes 131 in the welding areas 126 for hanging the film pouch 100 in a product dispenser 200 (see FIG. 6) or in other mechanical or automatic equipment.

FIG. 3 shows a simplified sectional view with a vertical sectional plane through the metering pump 1 shown in FIG. 1 and FIG. 2. FIG. 3A shows it in the unactuated state, FIG. 3B shows the metering pump 1 during actuation, and FIG. 3C shows the state after actuation.

In FIG. 3A, it can be seen that the pump chamber 11 is (fluidically communicating) connected to the bag main volume 162 by the fill opening 18. The occlusion part 20 is pressed against the air valve seat 8 by virtue of the return force of the air valve diaphragm 21, or rather the spring/articulated corrugations formed therein. This isolates the valve chamber 12 from the first outlet passage 28, which is connected to the pump chamber 11 via the outlet passage opening 6. Likewise, the occlusion part 22 is pressed against the outlet valve seat 13 by the return force of the outlet valve diaphragm 23, isolating the valve chamber 12 from the second outlet channel 29.

In the event of an undirected pressure on the foil bag 100 from the outside, the pressurized fluid-like product from the bag main volume 162 can enter the valve chamber 12 through the now open air valve 35, after which the pressure within the valve chamber 12 and the pressure within the bag main volume 162 are equalized. Thereby, the occlusion part 22 of the outlet valve 34 is pressed into the outlet valve seat 13 under the action of the return force of the outlet valve diaphragm 23 and under the action of the pressure within the bag main volume 162, which reliably prevents the fluid-like product from leaking out of the film pouch 100.

To apply the fluid-like product, the user now pushes on the center of the decompression crown 39 with his or her finger, a process shown in FIG. 3B. The upper film 160 is elastically deformed under the finger, thereby closing the fill opening 18 and separating the pump chamber 11 from the bag main volume 162.

As a result of the increase in pressure in the pump chamber 11, due to further pushing of the pump diaphragm 17, the fluid-like product is pumped out of the pump chamber 11, through the first outlet passage 28 and through the air valve 35 into the valve chamber 12. This creates a greater pressure in the valve chamber 12 than in the bag main volume 162, which now also lifts the outlet valve diaphragm 23 upward, opening the outlet valve 34.

The fluid-like product now passes through the second outlet channel 29 and the dispensing opening 16 (also called pump outlet) to the outside and is thereby applied. At the end of the dispensing operation, as soon as the pressure in the valve chamber 12 is equalized with the pressure of the bag main volume 162, the air valve 35 and the outlet valve 34 close hermetically due to the return force of the air valve diaphragm 21 and the outlet valve diaphragm 23. The fluid-like product can no longer escape from the metering pump 1, and air cannot enter the metering pump 1 either. This is illustrated by FIG. 3C. At the same time, the pump diaphragm 17 returns to its original shape due to its return force, thus creating a negative pressure in the pump chamber 11, which draws in the next dose of fluid-like product through the fill opening 18 from the bag main volume 62. In this process, the decompression crown 39 prevents the upper film 160 from adhering to the fill opening 18 during the filling process of the pump chamber 11, by virtue of the flow gaps 25.

Furthermore, the decompression crown 39 functions to protect the metering pump 1 from unintentional actuation if, for example, it is located in a pocket. In the event of squeezing the pump diaphragm 17, the decompression crown 39 prevents the build-up of excess pressure in the pump chamber 11, since the fill opening 18 can only be sealed by a finger or a similar shape.

The fill opening 18 is closed only by way of targeted pushing with the finger or the pressure pin 201 of a product dispenser 200 on the center of the decompression crown 39. In this context, the decompression crown 39 also facilitates tactile location of the correct point for activating the metering pump 1 with the finger.

FIG. 4 and FIG. 5 show a second variant of a foil pouch 100 with a metering pump 1, specifically for metering smaller quantities, in particular for applications from the fields of pharmaceutics or perfumery. Preferably, a single dose can comprise between 10 ml and 80 ml, further preferably between 20 ml and 60 ml.

Similarly to the first embodiment, the second embodiment of the metering pump 1 basically comprises the same components, has the same mode of operation and also the same manufacturing method.

The second variant differs primarily in the arrangement, shape and size of the individual components. Furthermore, it has additional components such as a stiffening frame 90 and a standing base 91.

The second embodiment of the metering pump 1 also comprises the base part 2 and the top part 3, which are connected to each other by the connecting element 4. On the base part 2, the pump chamber base 5 is formed with the opening 6 of the first outlet channel 28, wherein the groove 9 surrounds the pump chamber base 5.

At the rear end of the base part 2, a stiffening frame 90 with a standing base 91 are arranged. These allow the container 100 to be easily stored in an upright position.

A valve chamber base 7 is formed in the front portion of the base part 2. Here, the valve chamber base 7 is configured as two rings, which are arranged in the left and right corners of the base part 2 and are connected by a valve chamber base channel 7*a*. All chambers and fluid connections are outlined at their edges by a groove 9. The inside of one ring comprises the opening of the air valve seat 9, and the inside of the other ring comprises the opening of the outlet valve seat 13. Such an arrangement of the components allows the metering pump 1 to be shortened in length.

Figures 4A, 4B, 4C:
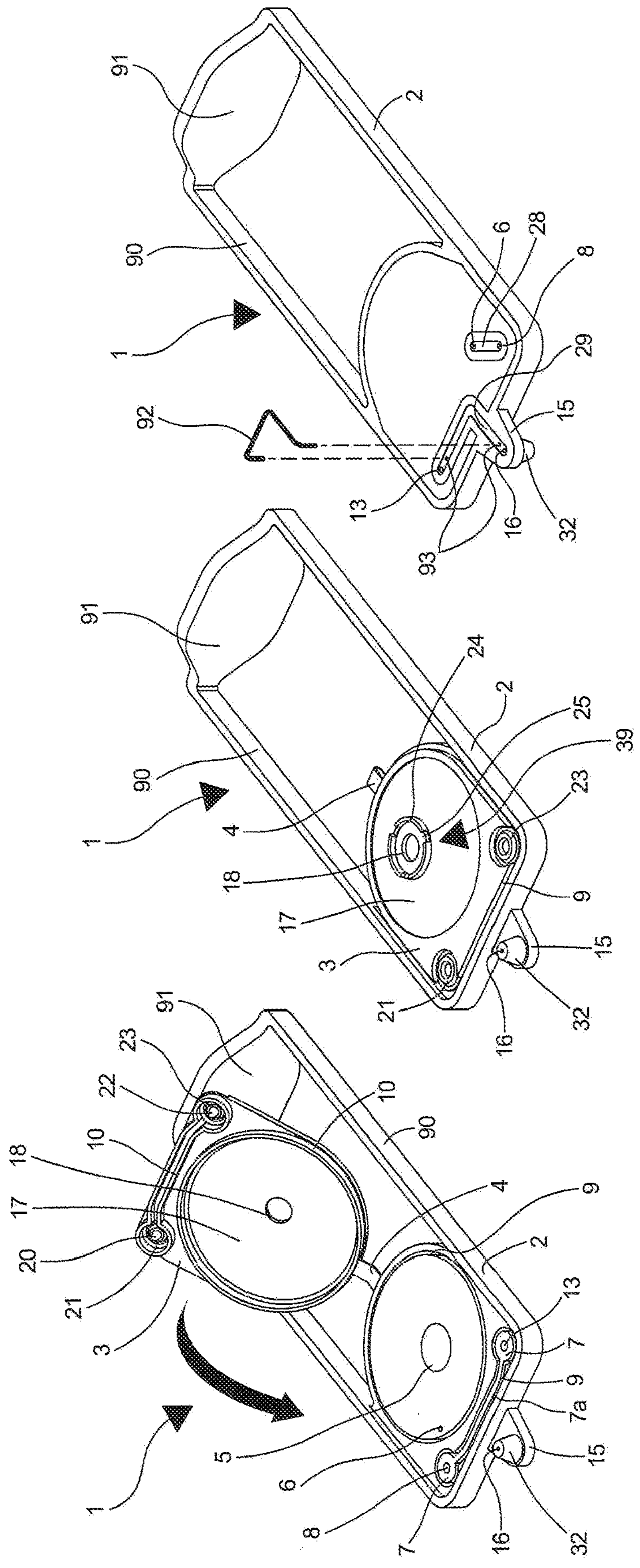
FIGS. 4A, 4B, 4C show a metering pump according to a second embodiment, respectively in an unassembled open state, in an assembled closed state seen from above, and in an assembled closed state seen from below.

FIG. 4A illustrates the assembly process. The two housing halves, injection molded as an integral part, are folded together and subsequently welded.

The front portion of base part 2 has a dispensing console 15, on which a spray nozzle 32 with a dispensing opening 16 is formed. The upper part 3 comprises the pump diaphragm 17, in which the fill opening 18 is centrally located. Furthermore, the upper part 3 comprises the valve chamber cover 19 with the air valve diaphragm 21, the outlet valve diaphragm as well as with the occlusion part 20 of the air valve 35 and the occlusion part 22 of the outlet valve 34. The tongue 10 surrounds all compartments, i.e. in particular all chambers and fluid connections. The shape of the tongue 10 is identical to the shape of the groove 9.

FIG. 4C shows the metering pump 1 of the foil pouch 100 with a bacteriostatic, bactericidal or fungicidal element 92, particularly for pharmaceutical fluids where there is a desire for aseptic storage before and after opening of the supply contained in the foil pouch 100.

The element (an insert) comprises a surface that may have an alloy of silver, copper, and zinc, for example having a copper content between about 1% and 9% and a zinc content of about 1%. The element 92 exhibits good antimicrobial activity.

Figures 5A, 5B, 5C:
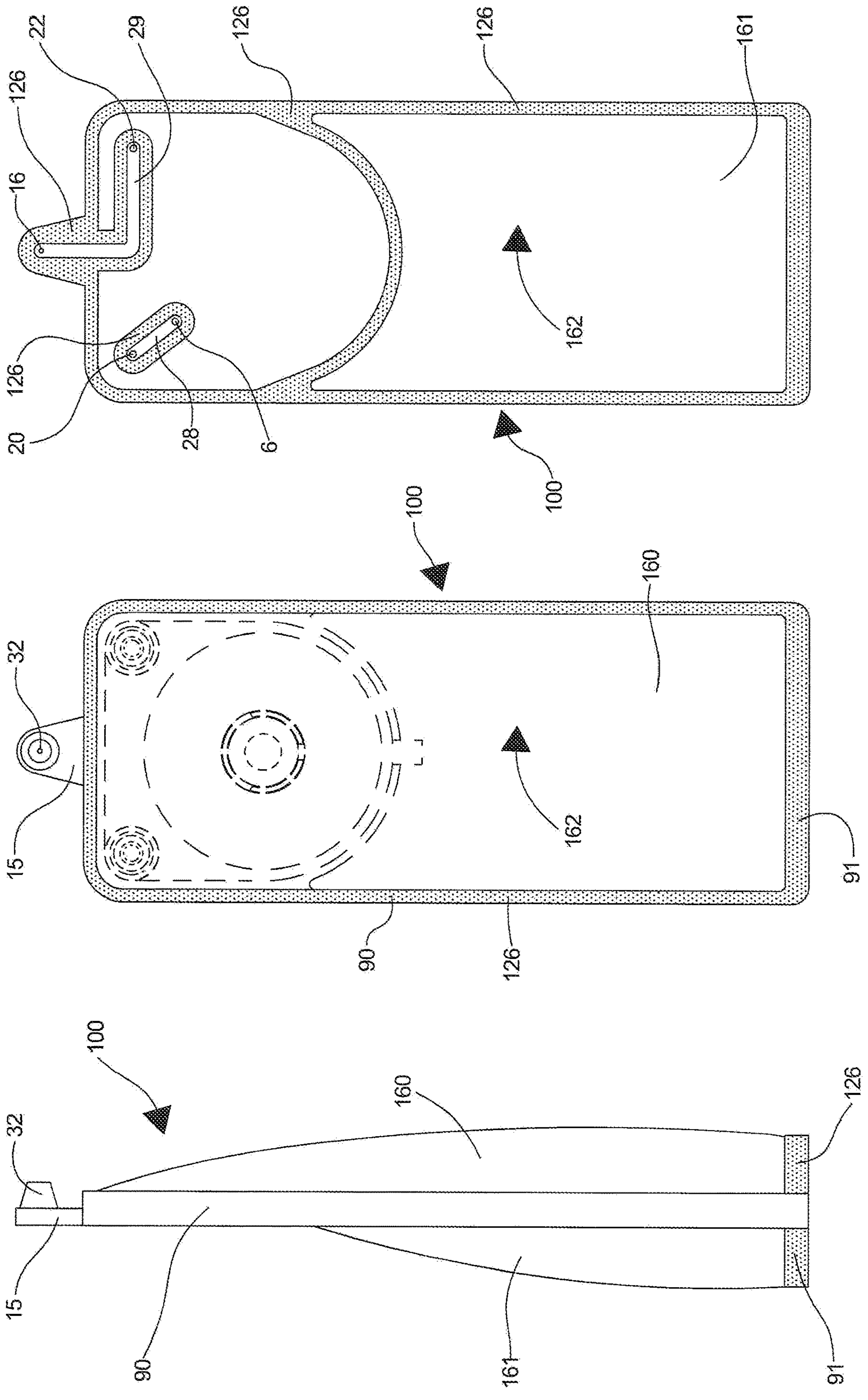
FIGS. 5A, 5B, 5C show a film pouch according to a second embodiment comprising the metering pump of FIGS. 4A to 4C, respectively shown from the side, from the front, and from the back.

FIG. 5A shows a side view of the metering pump 1 of FIG. 4 in a film pouch 100. Enclosed by the stiffening frame 90, the bag main volume 162 is formed by welding the upper film 160 to the upper edge of the metering pump 1 and the lower film 161 to the lower edge of the metering pump 1. The standing base 91 allows the film pouch 100 to stand upright. For example, upright containers are popularly used in the perfume industry and in the personal cleansing and care products industry.

FIG. 5B shows the same foil pouch 100 with metering pump 1 from the front, FIG. 5C accordingly from the rear. Welding areas 26, 126 are again indicated as dotted areas. On the rear side (in FIG. 5C), the opening 6 of the first outlet channel 28 can be seen as a through hole. The first outlet channel 28 thus connects the air valve 35 to the pump chamber 11. The first outlet channel 28 is designed as a groove in the pump housing and is circumferentially welded to the film of the film pouch on the open side. The second outlet channel 29, which connects the outlet valve 34 with the dispensing opening 16, is also surrounded by a welding area 26, and thus covered or sealed by the foil. The placement (and/or length) of the dispensing console 15 as well as the dispensing direction of the dispensing opening 16 can be adapted to the application.

Figure 6:
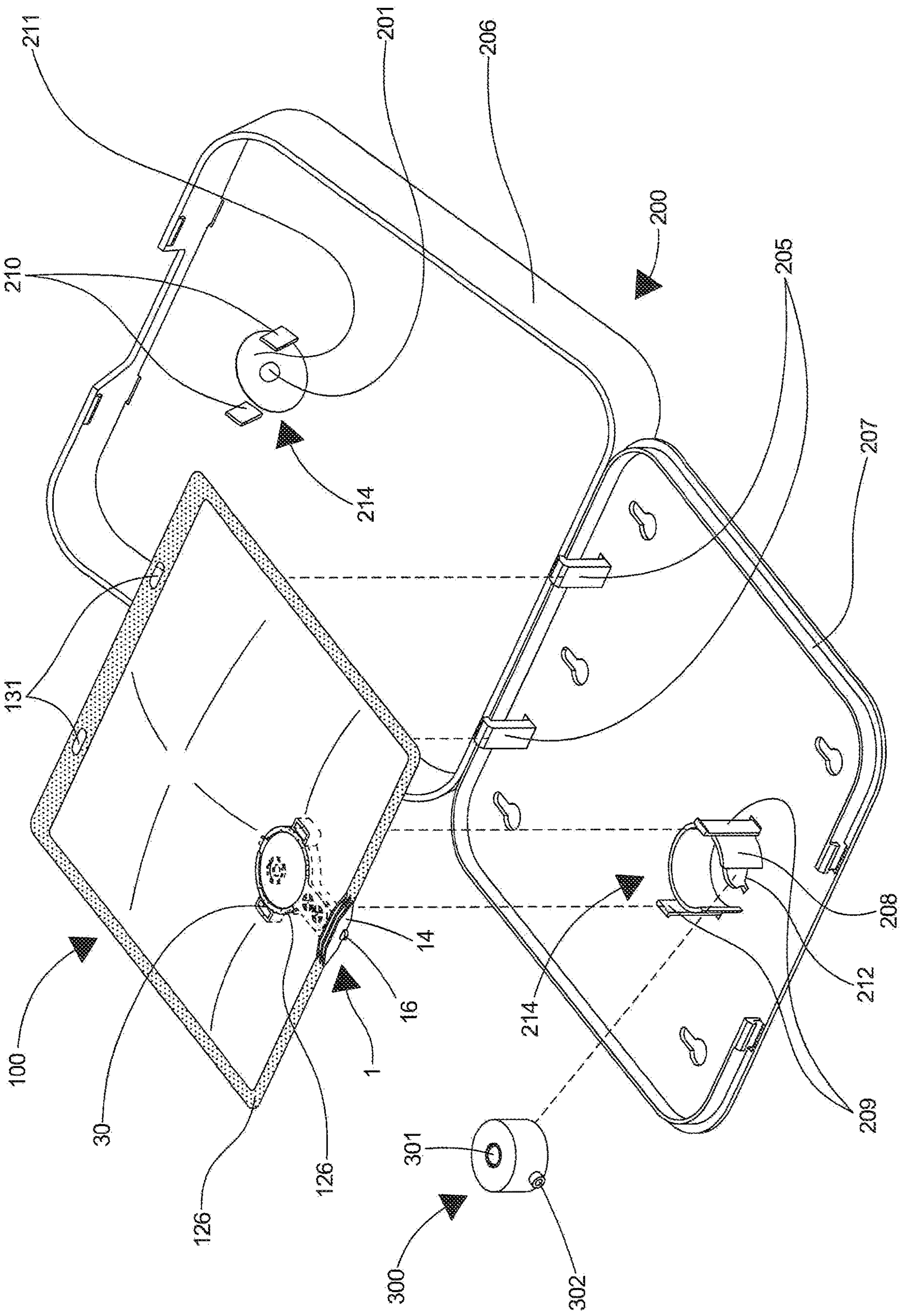
FIG. 6 shows a product dispenser according to a first embodiment with a foil pouch according to a third embodiment.

In FIG. 6, another film pouch 100 with a metering pump 1 is shown with an associated product dispenser 200.

The metering pump 1 has, for mounting in a corresponding mount 214 of the product dispenser 200, in addition to the features already described, at least one mounting area 30 for making a snap-in or latching connection. The mounting area 30 comprises two snap-in tabs, but instead snap-in lugs, projections and/or edges for engaging from behind can also be provided. The arrangement and number of fasteners is to be selected depending on the application. In this way, the metering pump is positioned and retained in the product dispenser.

The film pouch 100 also has two suspension eyes 131 with which the film pouch can also be hung/fixed on corresponding hooks 205 in the product dispenser 200. Again, the position and number is to be selected according to the application.

The latching tabs of the fastening area 30 are part of the base part 2 of the metering pump 1. When the metering pump 1 is welded between the upper film 160 and the lower film 161, through-cuts are formed in the two films in the area of the latching tabs. In this process, the welding area 126 surrounds the latching tabs from both sides, which ensures the sealing of the film pouch 100.

Due to this additional possibility of mechanical attachment, the appropriately equipped film pouches 100 can be used not only manually, but also in dispenser housings (e.g., hygiene dispensers, soap dispensers) and/or in automatic machines and mechanisms in which dosing of the fluid-like product from a primary package is applied. Examples include automatic cleaning equipment (washing machines or dishwashers), automatic food dispensers and/or automatic beverage preparation machines.

FIG. 6 further illustrates the process of securing a film pouch 100 with metering pump 1 in a product dispenser 200.

The product dispenser 200 is provided for holding the film pouch 100 and allows manual actuation of the metering pump 1 from the outside by using a finger, as well as automatic contactless actuation of the metering pump 1 by using an automatic actuator 300.

The product dispenser comprises the dispenser housing base 207 and the dispenser housing lid 206, which are connected to each other by a film hinge. This allows the complete product dispenser to be manufactured in one piece in the open state with a (two-piece only) plastic injection mold.

On the inside of the dispenser housing base 207, hooks 205 for suspending the film pouch 100 and the lower part of the mount 214, into which the metering pump 1 is engaged, are arranged. In this regard, the mount 214 comprises a metering pump seat 208 and associated metering pump clamps 209. The dispenser housing cover 206 comprises wedges 210 corresponding to the metering pump clamps 209, and a diaphragm-mounted push button 211 with a push pin 201.

The metering pump housing includes at least one mounting area 30 for engaging a snap-on connection. In this regard, the fastening area 30 comprises at least one rear engagement edge, a snap-in tab and/or snap-in lug.

The film pouch 100 is secured in the dispenser housing 204 by hanging the suspension lugs 131 on the hooks 205 of the product dispenser 200, and the metering pump 1 is placed with the latching lugs of the fastening area 30 on the metering pump clamps 209 up to the stop in the metering pump seat 208.

Figure 7A:
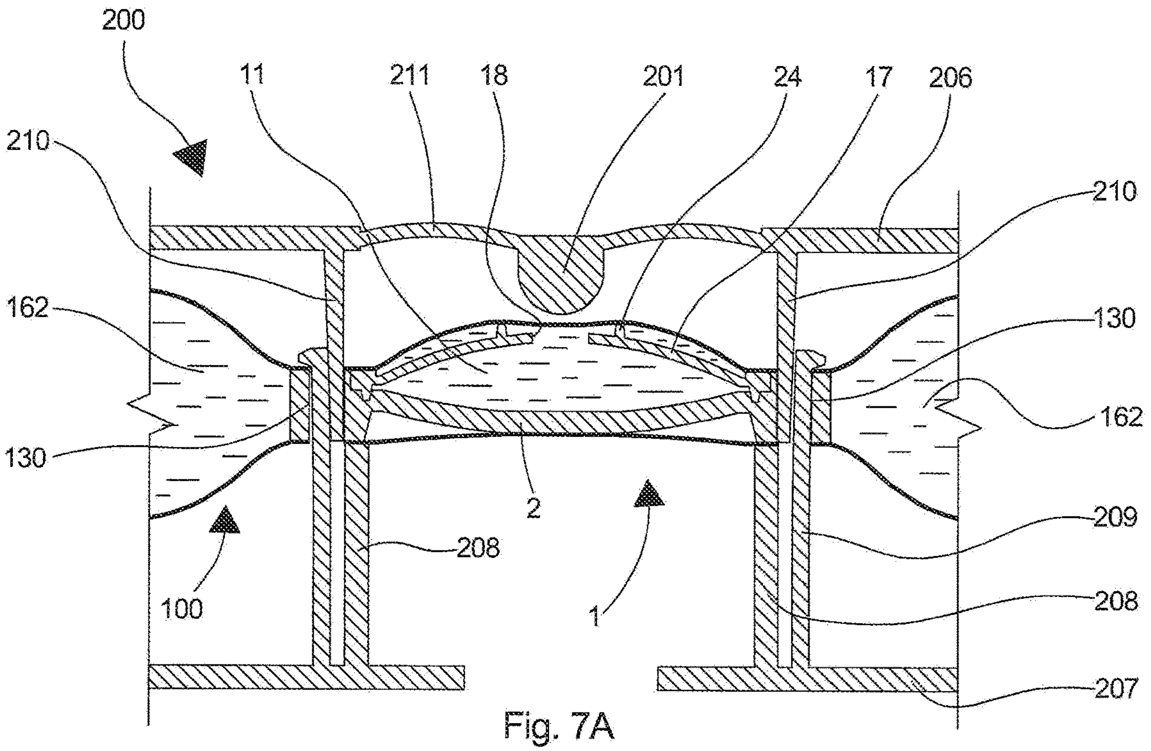
FIGS. 7A, 7B show the product dispenser of FIG. 6, in a sectional view, respectively shown with an actuator installed for automatic actuation on one side, and without an actuator for manual actuation on the other side.
Figure 7B:
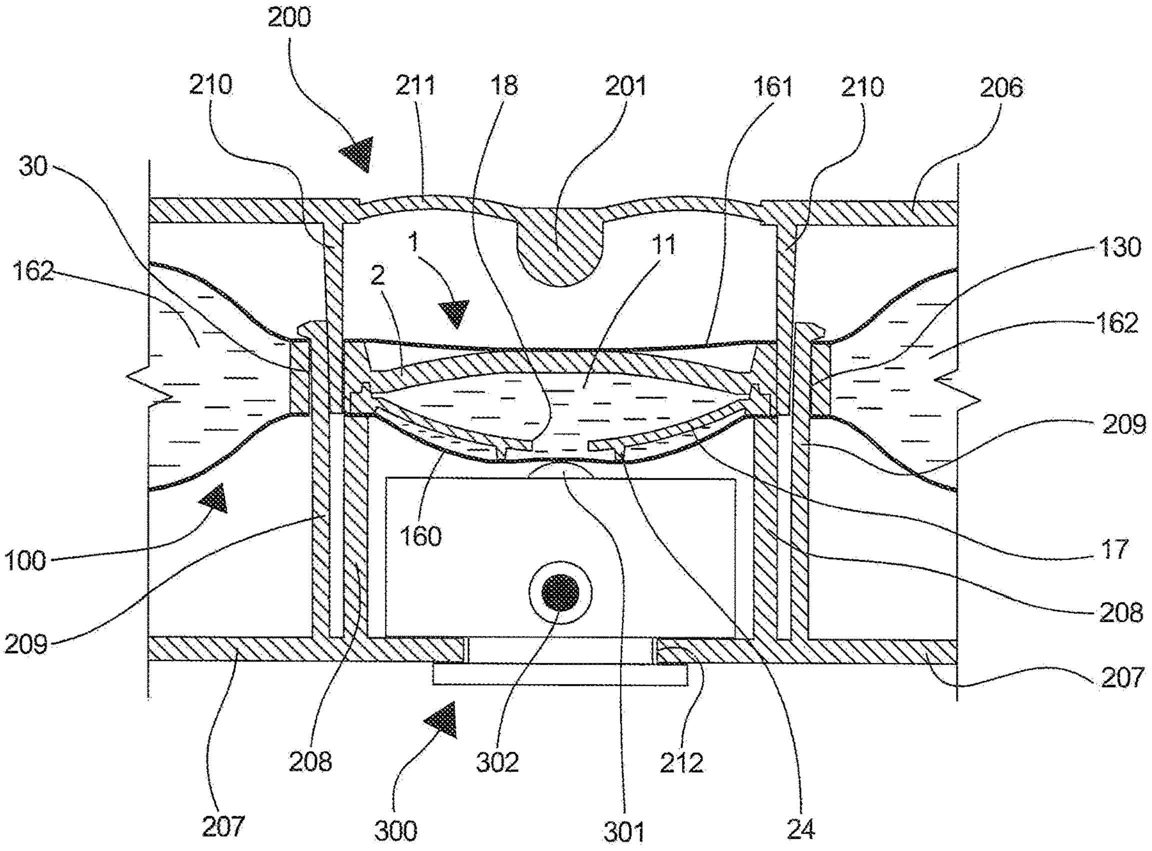

FIG. 7A shows the attachment of the metering pump 1 in a sectional view in detail. When the dispenser housing cover 206 is closed, the wedges 210 enter the latching tabs of the mounting area 30 and bend the metering pump clamps 209 in such a way that the metering pump 1 is positively fixed in the mount 214 and substantially without play. For manual operation of the metering pump 1 mounted in the product dispenser, a push button 211 is provided. By pushing the push button 211, the push pin 201 depresses the pump dome 17, thereby actuating the metering pump 1.

Optionally, the product dispenser 200 can be equipped with an actuator 300 for contactless activation of the metering pump 1.

The actuator 300 comprises a battery and a servo drive that can move a plunger 301 back and forth. Furthermore, the actuator 300 comprises a sensor 302 for detecting a hand. The sensor 302 may be, for example, a brightness sensor, a light barrier sensor, a distance sensor, etc. The actuator 300 is mounted in a mount 208 of the product dispenser 200. This is accomplished by positively securing the actuator 300 in a detent or actuator seat 212 of the dispenser housing base 207.

In order for the plunger 301 of the actuator 300 to actuate the metering pump 1, the film pouch 100 is fixed in an upside-down position in the product dispenser 200 with the pump dome 17 on the side of the actuator 300. The push button 211 for manual operation is thus inoperative.

In the context of FIG. 8 to FIG. 17, the foregoing will be restated in other words. However, the underlying ideas and methods of operation are the same and apply without further ado to all embodiments.

Figures 8A, 8B:
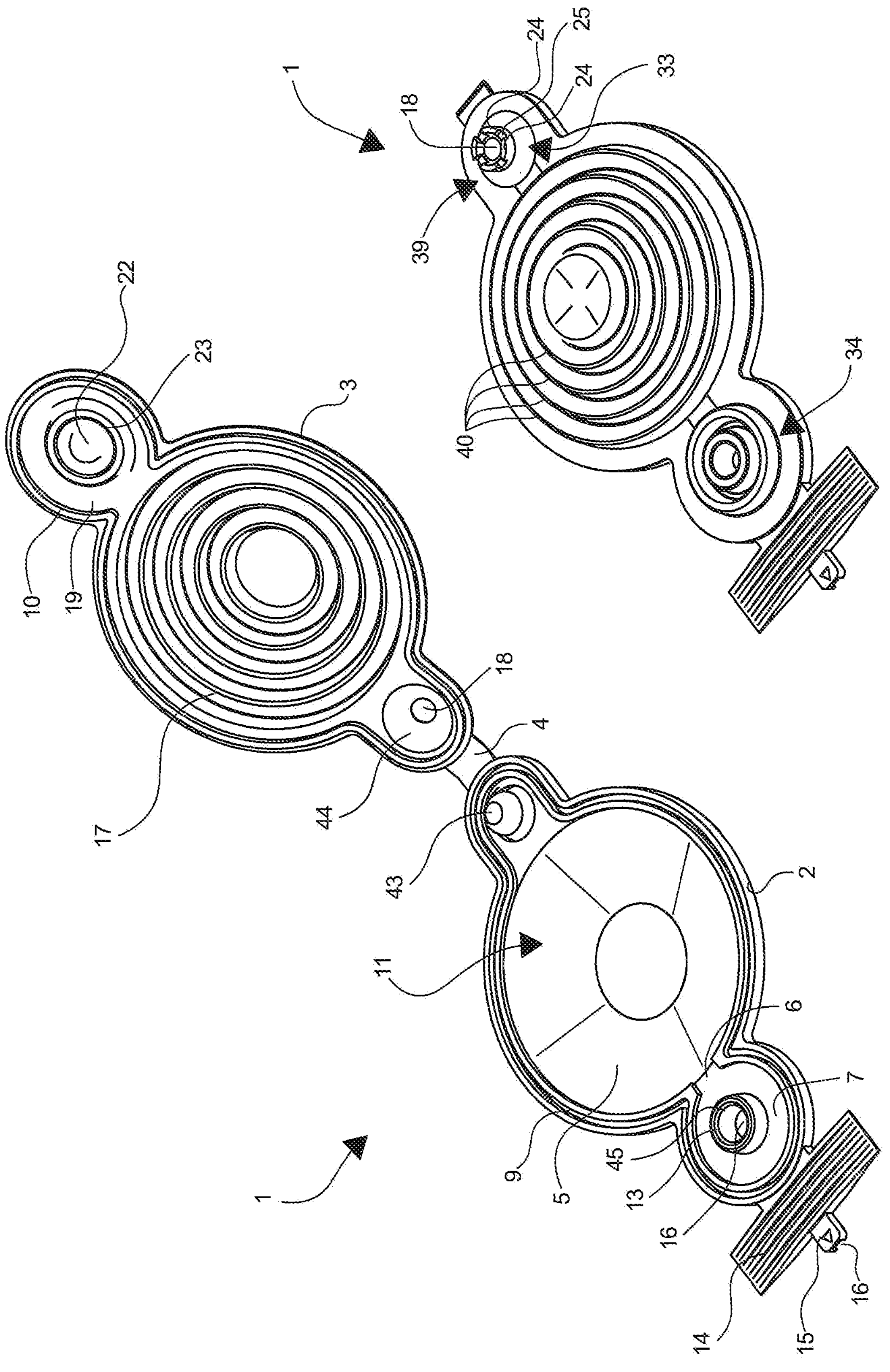
FIGS. 8A, 8B, 8C show a metering pump according to a fourth embodiment, respectively in an unassembled open state, and in an assembled closed state viewed from above, and in an assembled closed state viewed from below.

FIG. 8A shows a metering pump according to a fourth embodiment in the unassembled open state. In FIG. 8B, the metering pump is shown in the assembled closed state from above.

The metering pump comprises a pump housing with a pump chamber 11, a pump inlet 18 and a pump outlet 16. The pump chamber 11 is defined by a pump chamber base 5 and an elastically deformable pump dome 17. The pump housing is joined from a first pump housing portion 3 and a second pump housing portion 2. The pump dome 17 is a component of the first pump housing portion 3 and the pump chamber base 5 is a component of the second pump housing portion 2.

All of the elements of the metering pump 1 are arranged and configured in such a way that the metering pump 1 can be manufactured in one piece by plastic injection molding, thermoforming or other processes. When the first and second pump housing portions are folded together, the occlusion part 22 of the outlet valve 34 is positioned in the sealing seat 13 of the outlet valve and the occlusion part 43 of the inlet valve 33 is positioned in the sealing seat 44 of the inlet valve 33. The tongue 10 and groove 9 ensure the correct placement of the upper and lower sections 3, 2. The entire construction is very thin-walled and therefore saves material.

The first pump housing portion 3 and the second pump housing portion 2 together form an integral component and are connected by a film hinge 4. The integral component has no undercuts in a defined demolding direction, so that it can be manufactured using a two-part injection mold.

To assemble the metering pump 1, the two parts are folded together and welded together in a joining area using ultrasonic or thermal processes. Alternatively, the connection can be made by positive locking.

The first pump housing portion 3 and the second pump housing portion 2 have congruent alignment geometries 9, 10. In addition to proper positioning, groove 9 and tongue 10 may also serve to hermetically seal the working chamber and valve chambers. If necessary, the gaps can be sealed with a sealant if the housing parts are not welded.

Figure 8C:
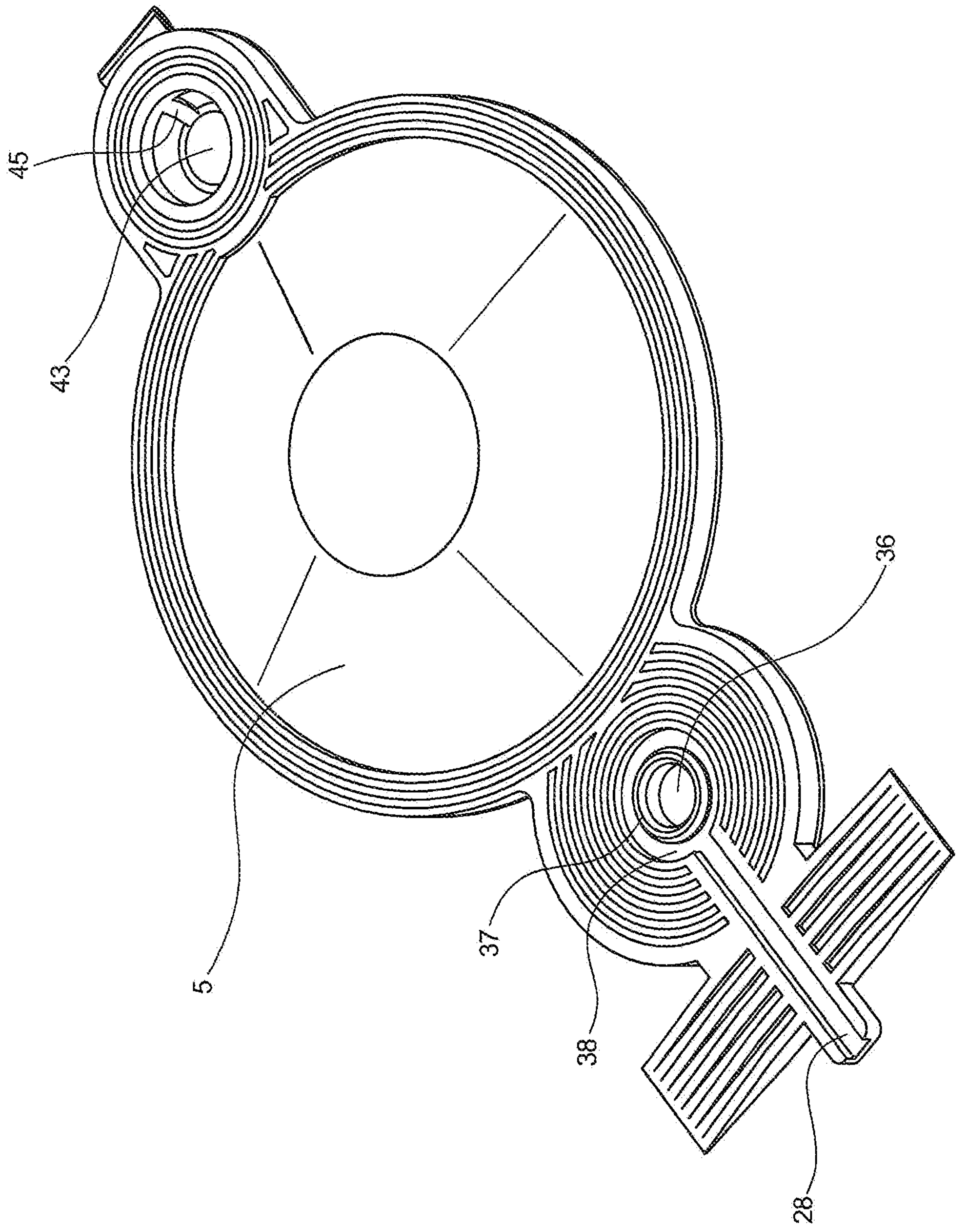

FIG. 8C shows the metering pump from below in the assembled closed state.

The occlusion part 43 of the inlet valve 33 is elastically supported on the second pump housing portion 2 by a rib 46, optionally by a plurality of ribs. The production-induced opening below the occlusion part 43 is closed by the circumferentially welded lower foil 161 of the foil bag 100.

The pump housing further comprises at least one groove 28 configured and arranged to form, at least in sections, a fluid connection between the pump chamber 11 and the pump outlet 16.

Figure 9B:
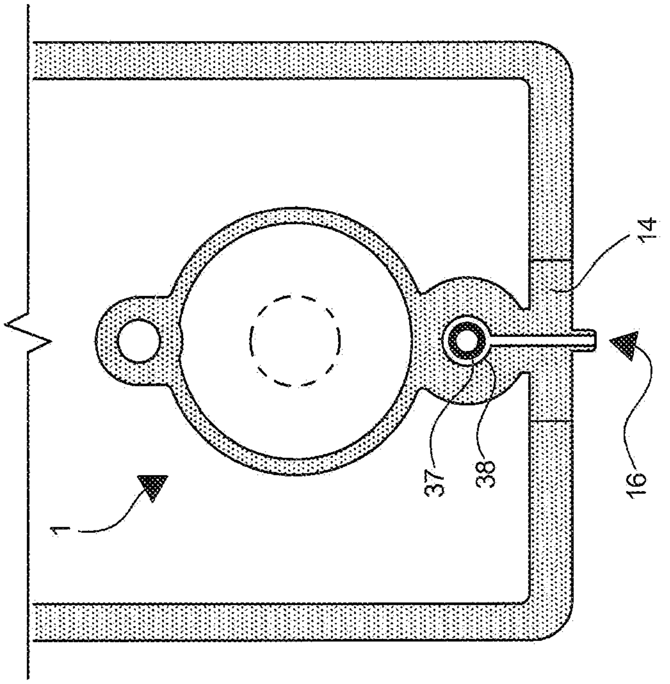
FIGS. 9A, 9B show a film pouch according to a fourth embodiment with the metering pump of FIGS. 8A to 8C, respectively shown from the front, and from the back.
Figure 9A:
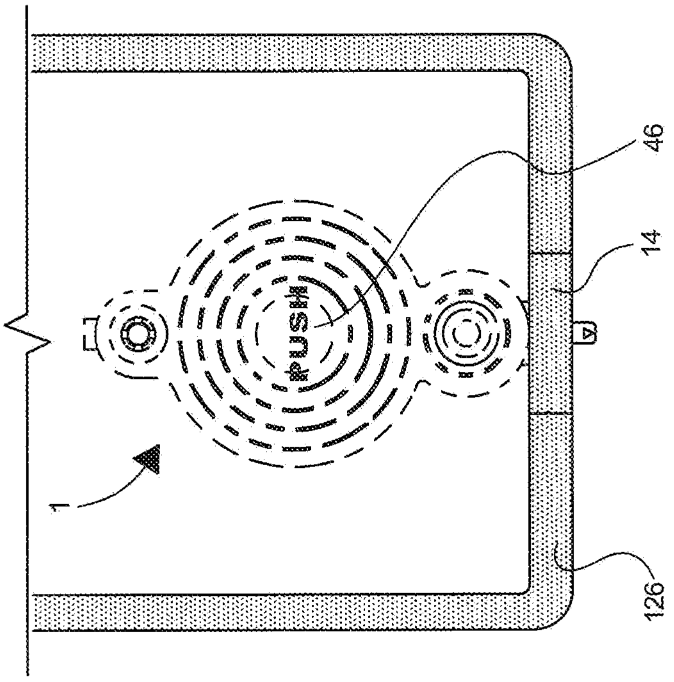

FIGS. 9A, 9B illustrate a film pouch according to a fourth embodiment with the metering pump of FIGS. 8A to 8C, as viewed from the front and from the rear. The metering pump 1 is welded with its foot 14 between the foils 160, 161. The foils may have a visual or haptic marking to inform the user of the position of the pump dome 17, thus facilitating operation.

The metering pump 1 is accordingly arranged in the film pouch 100 and welded thereto. It is particularly advantageous if the container 100 and the metering pump 1 are made of the same or a similar thermoplastic material.

Figure 10A:
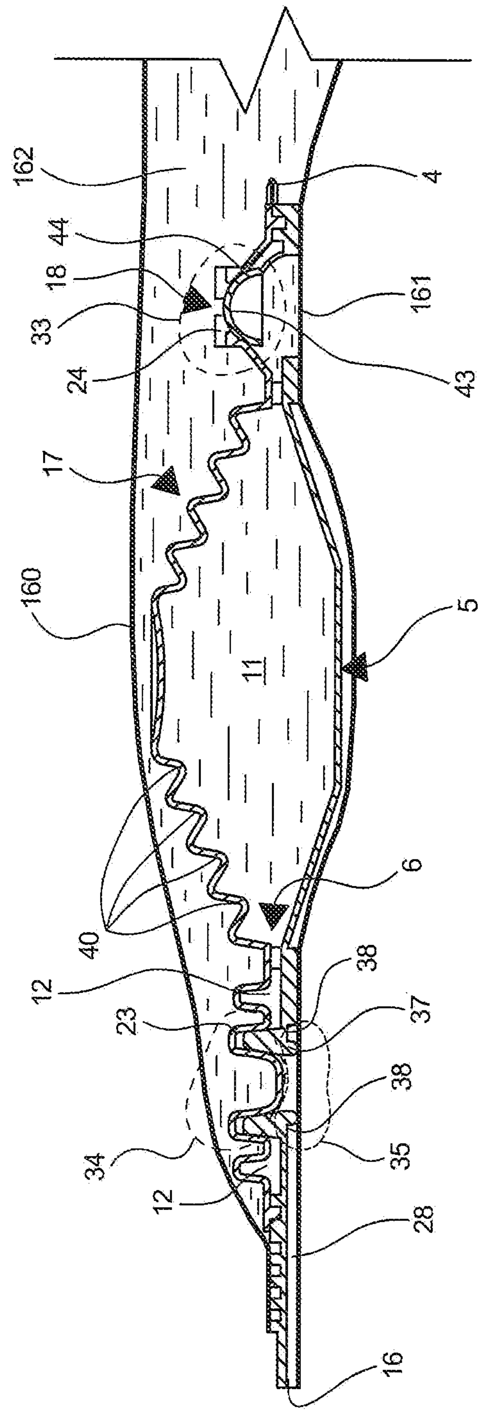
FIGS. 10A, 10B, 10C show the metering pump of FIGS. 8A to 8C in the film pouch of FIGS. 9A, 9B, respectively in an unactuated state, in an actuated state, and in a post-actuated state.
Figure 10B:
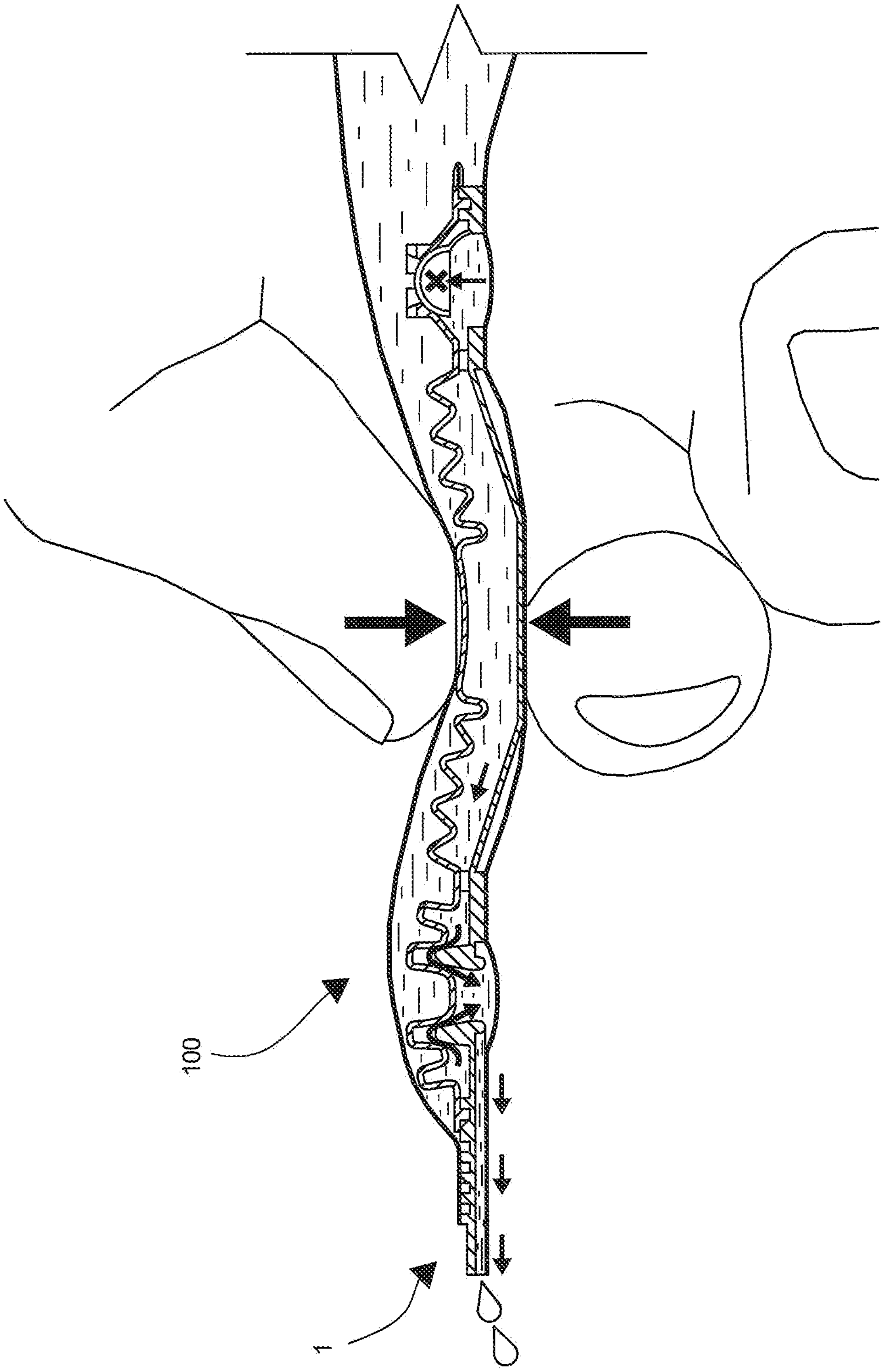
Figure 10C:
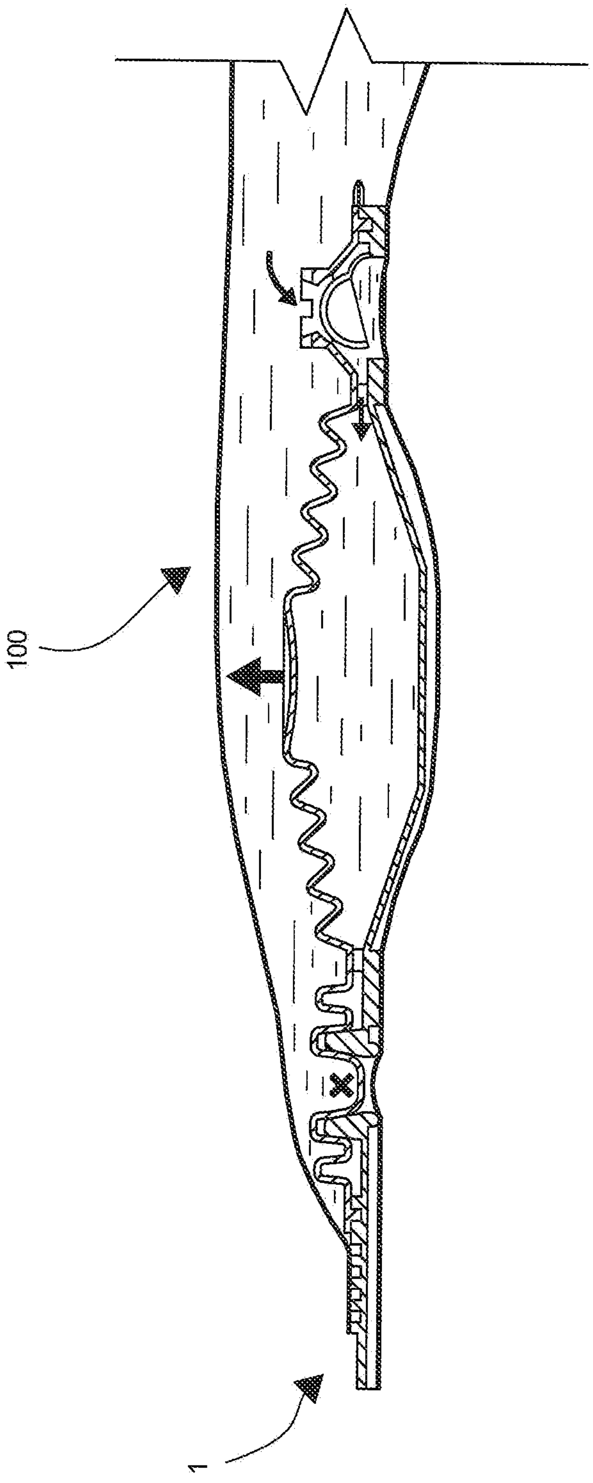

FIGS. 10A, 10B, 10C show the metering pump of FIGS. 8A to 8C in the foil pouch of FIGS. 9A, 9B, in an unactuated state, in an actuated state, and in a post-actuated state.

The metering pump 1 comprises an outlet valve 34 disposed in a fluid connection from the pump chamber 11 to the pump outlet 16 and configured as a non-return valve. The outlet valve 34 has an occlusion part 22 with a convex sealing surface and a sealing seat 13 corresponding to the occlusion part 22. In this regard, the occlusion part 22 is an integral part of the first pump housing portion 3, although it may also be part of the second pump housing portion 2. The corresponding seal seat 13 is an integral part of the other pump housing portion 3, 2.

The pump inlet 18 is arranged externally of the pump chamber 11. The metering pump 1 comprises an inlet valve 33, which is arranged in a fluid connection from the pump inlet 18 to the pump chamber 11 and is formed as a non-return valve.

In FIG. 10A, the unactuated state is shown. The outlet valve 34 is held shut by the biasing force of the valve diaphragm and/or spring/seal corrugation 23 and the pressure in the container/film pouch 100, after all, the pressurized area on the side of the film pouch/bag main volume 162 is greater than the pressurized area on the side of the valve/valve chamber 12. It is reasonable to assume that the pressure in the pump chamber 11 in the unactuated state is equal to or lower than the pressure in the bag main volume 162. It is further reasonable to assume that the pressure in the valve chamber 12 is equal to or lower than the pressure in the pump chamber 11. The inlet valve 33 equalizes the pressure in the direction of the pump chamber 11, whereupon the pressure in the valve chamber 12 becomes greater than the pressure in the bag main volume 162.

It can be readily seen that the occlusion part 22 of the outlet valve 34 has a spring and/or seal corrugation 23 extending around the convex sealing surface. The seal seat 13 of the outlet valve 34 also has an annular rib 45 corresponding to the seal corrugation 23. The rib abuts the occlusion part 22 in the seal corrugation 23 when the outlet valve 34 is closed.

The outlet valve 34 also has an outlet valve opening 36 with a circumferential bead 37 and an annular channel 38 disposed outside the bead 37. Combined with the bottom sheet 161, these parts form another non-return valve 35 in the fluid connection from the pump chamber 11 to the pump outlet 16.

FIG. 10B shows the actuated condition, i.e., with the pump dome 17 depressed. Because of the inlet valve 33, pressure cannot escape in the direction of the bag main volume, but can escape only in the direction of the pump outlet 16. When actuated, the liquid enters the outlet valve chamber. The pressure of the outlet valve chamber becomes greater than that in the main chamber volume 162 located above it, causing the outlet valve 33 to open and the fluid to drain into the outlet channel.

FIG. 10C shows the condition after the pump dome 17 is depressed.

The pump dome 17 returns to its original shape due to the return force/elasticity, forming a (slight) negative pressure in the pump chamber 11. The outlet valve bead 37 keeps the system air-free, as the lower film is sucked towards it during the fluid retraction, thereby blocking the air path. Meanwhile, the outlet valve 34 closes. Inlet valve 33 opens, releasing new fluid into pump chamber 11. The decompression crown 39 serves to prevent the upper film from closing the inlet port 18 when it is drawn toward the inlet port 18 by the flow/vacuum.

The decompression crown 39 comprises a plurality of decompression teeth 24.

Figure 11A:
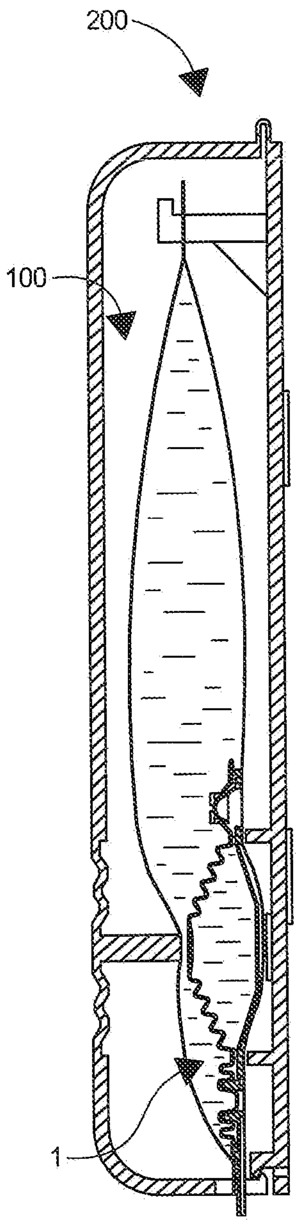
FIGS. 11A, 11B show a product dispenser according to a second embodiment with the foil pouch of FIGS. 9A to 10C.
Figure 11B:
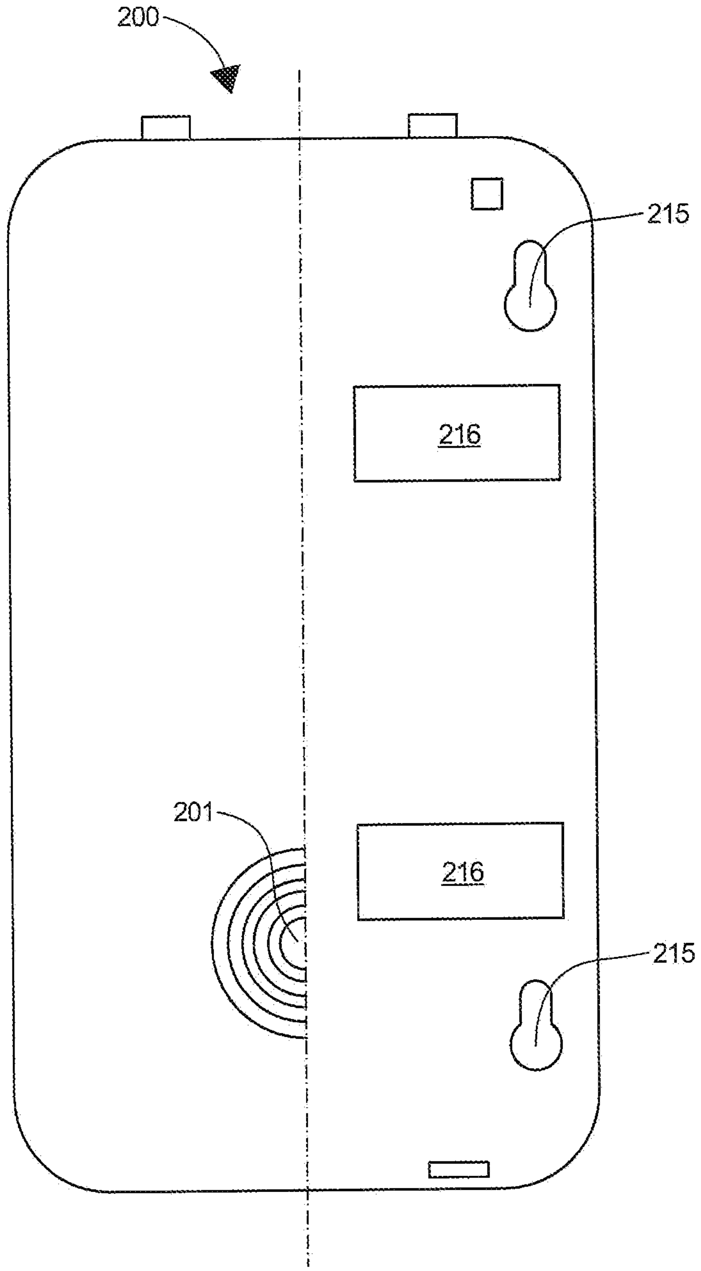

FIGS. 11A, 11B illustrate a product dispenser 200 according to a second embodiment with an exemplary foil pouch as shown in FIGS. 9A to 10C. At the rear, the product dispenser 200 includes hanging eyes 215. In addition, adhesive tape 216 suitable for an adhesive connection may be provided on the rear side.

The product dispenser 200 further comprises mounts 205, 209 for fixing the container 100 with the metering pump 1, as well as a flexibly supported push pin 201 for manual actuation of the metering pump 1.

In addition, the product dispenser 200 has an actuator seat 212 for receiving a motor-driven actuator 300 for automatic actuation of the metering pump 1.

The housing of the product dispenser 200 is injection molded in one piece. The front and rear sides are connected by a film hinge.

A complete system comprises a product dispenser 200 and a container 100. Optionally, the system further comprises a motor-driven actuator 300 in the container 100 for automatically actuating the metering pump 1.

Figure 12A:
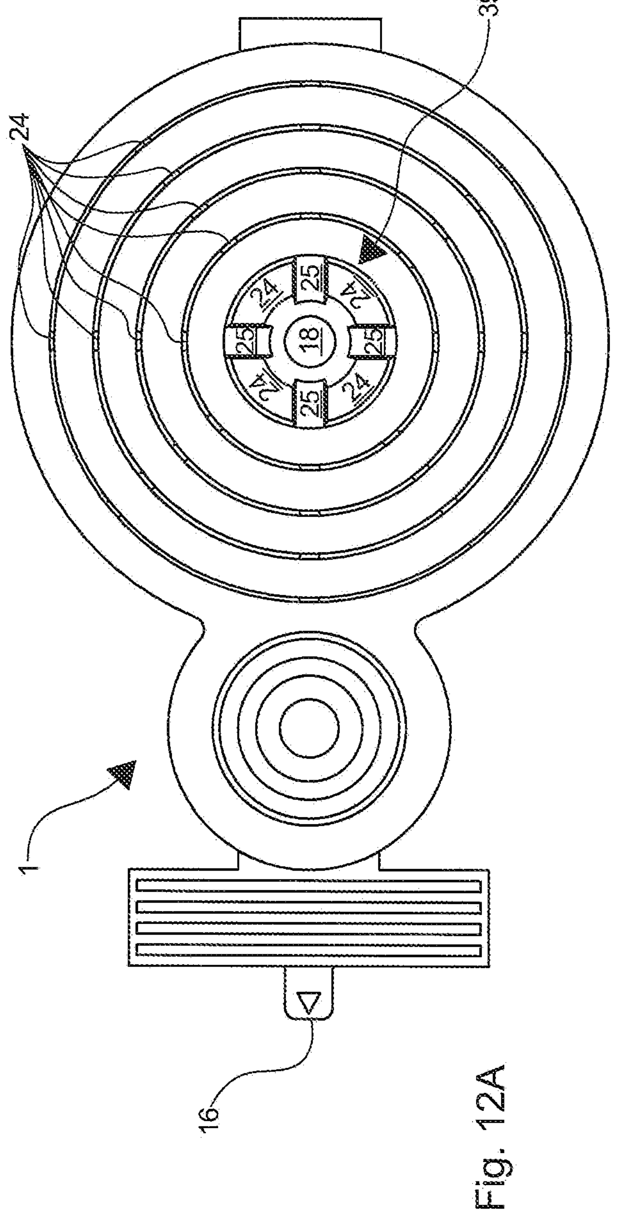
FIGS. 12A, 12B, 12C show a dispensing pump according to a fifth embodiment, respectively in a top view, and sectional views in unactuated and actuated states.
Figure 12B:
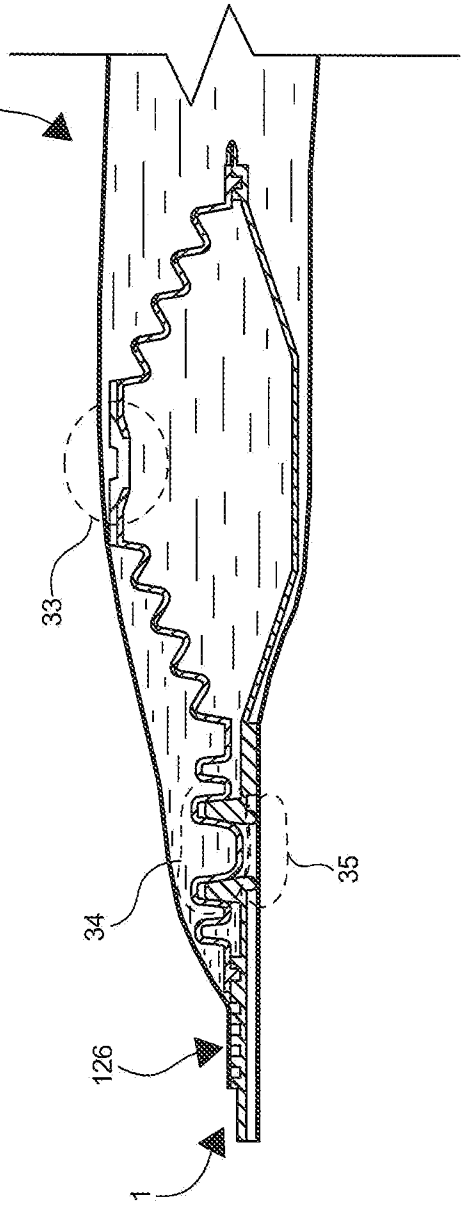
Figure 12C:
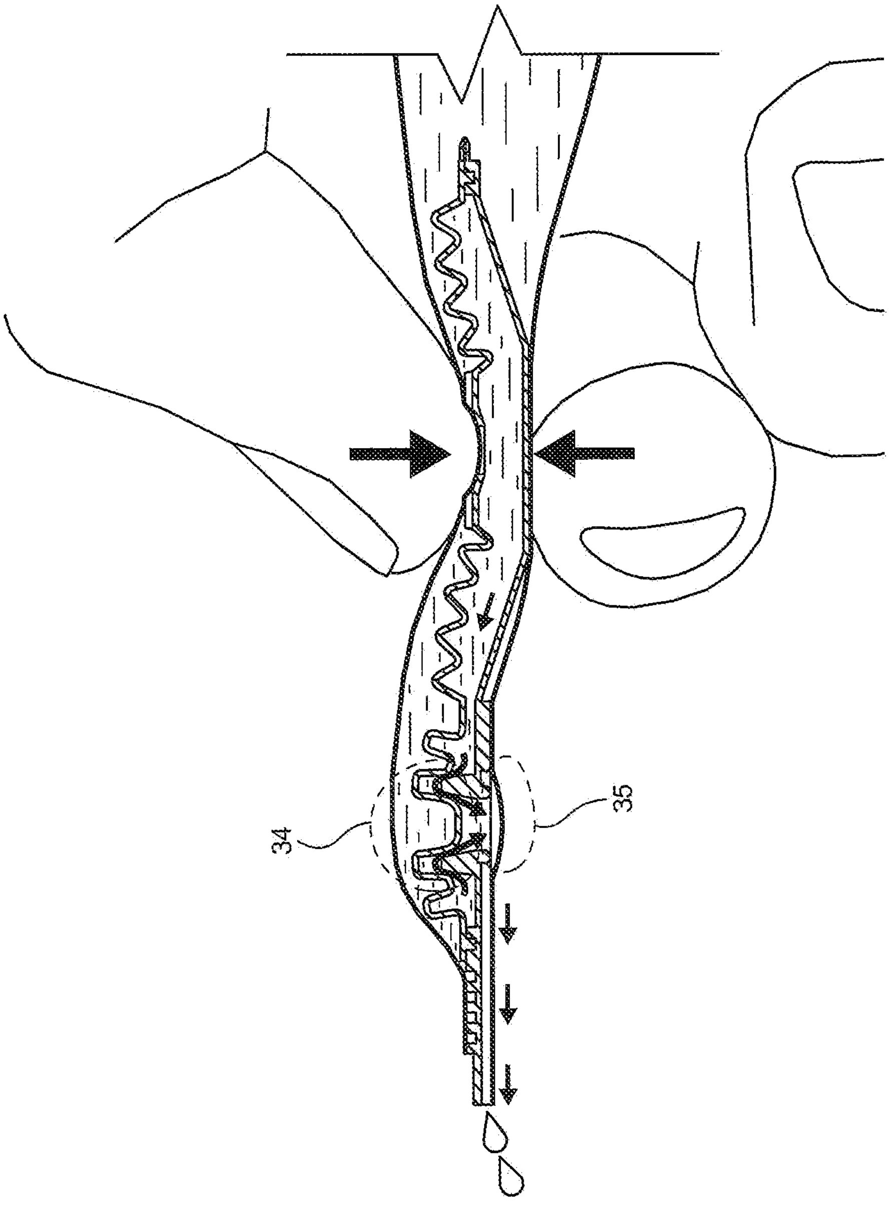

FIGS. 12A, 12B, 12C illustrate a metering pump 1 according to a fifth embodiment, in a top view as well as in sectional views in unactuated and actuated states.

The pump inlet 18 is arranged centrally in the pump dome 17. The metering pump 1 is actuated with a purposeful finger press or a flexible object pressed onto the center of the decompression crown. The fingertip or flexible object pushes the upper film 160 down into the inlet opening 18 and closes it.

This embodiment is used in cases where accidental actuation is particularly undesirable, for example in a purse. In addition, it can also act as a childlock. The return force of the pump dome 17 can be adjusted in such a way that a child's finger cannot push it down.

The pump dome 17 has a plurality of concentrically arranged spring corrugations 40. Further, a plurality of decompression teeth 24 are disposed on the pump dome 17. The decompression teeth 24 are spaced from each other at regular intervals.

The pump inlet 18 has a decompression crown 39. The decompression crown 39 comprises a plurality of decompression teeth 24, which are configured and spaced apart from each other in an annular manner around the pump inlet 18 such that two adjacent decompression teeth 24 form a respective decompression channel 25. After actuation, the decompression crown 39 and the decompression channels 25 formed by it ensure that the upper film 160 does not adhere to the metering pump 1 which would interrupt the volume flow in the direction of the pump inlet 18. In the variant described here, the pump inlet 18 is centrally located on the pump dome 17. In this respect, the decompression teeth 24 on the pump dome 17 can also be understood as part of the decompression crown 39.

Figure 13:
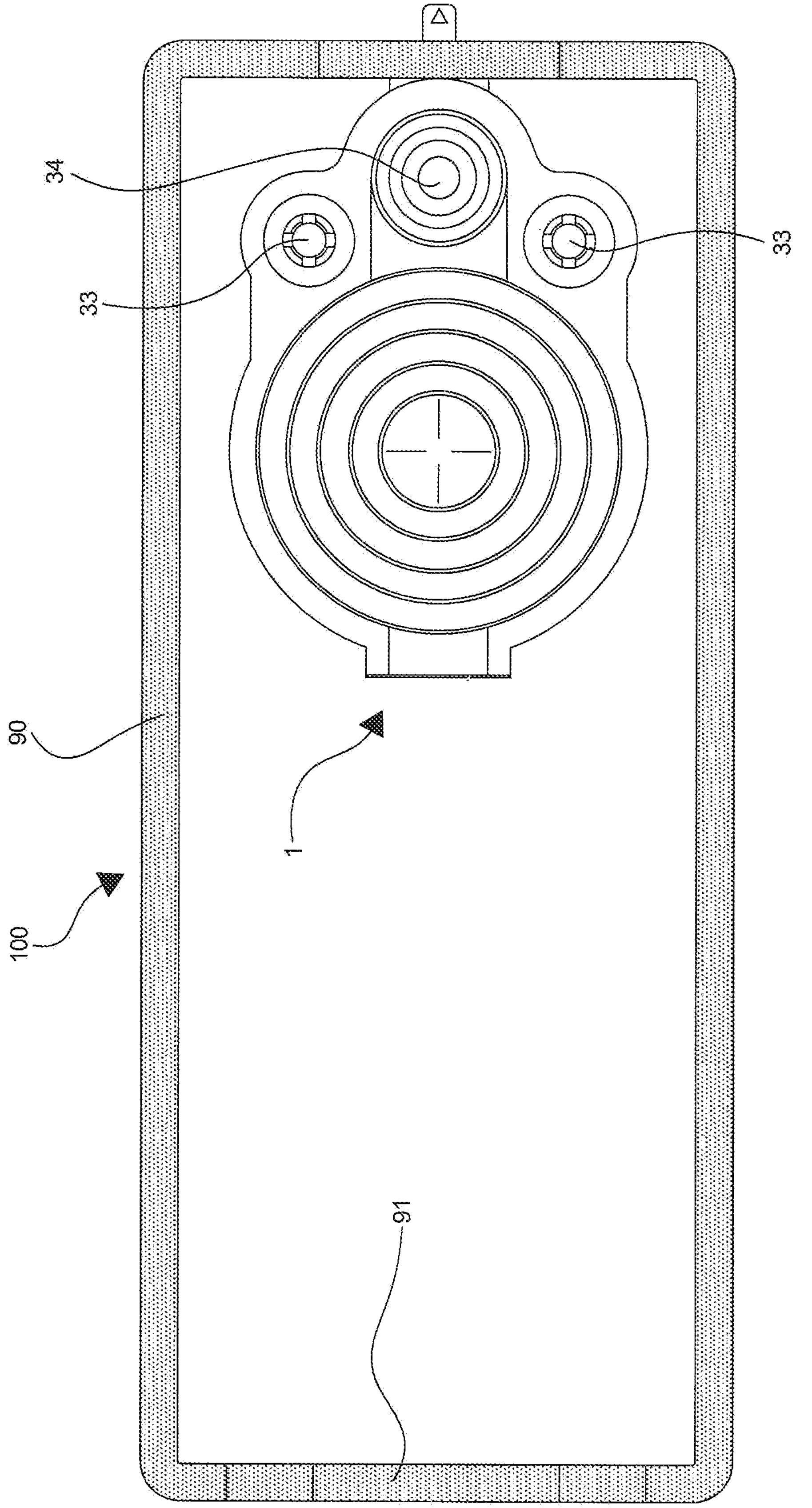
FIG. 13 shows another embodiment of a metering pump.

FIG. 13 shows a further embodiment of a metering pump 1 in a foil pouch 100. An outlet valve 33 is found on both sides of the outlet valve 34. The inlet valves can be positioned as desired. A greater quantity enables easier filling of the pump chamber 11, which is particularly advantageous for higher-viscosity products. A stiffening frame 90 is manufactured integrally with the metering pump 1. Furthermore, the metering pump 1 features an integrated standing base 91. Despite the fundamental lack of stability of a film pouch 100, the one shown here can be stored in an upright position.

Figure 14A:
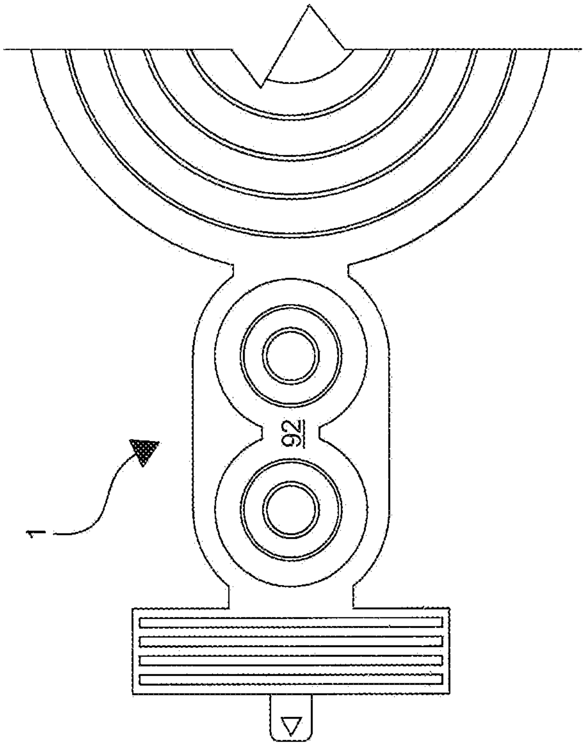
FIGS. 14A, 14B show a metering pump with an antibacterial insert.
Figure 14B:
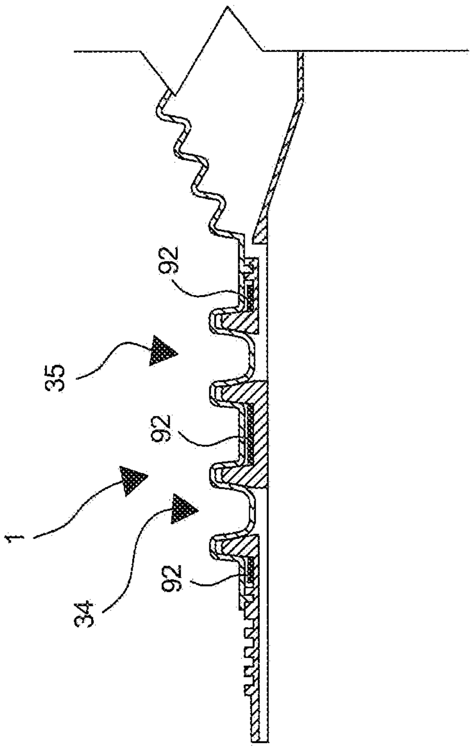

FIGS. 14A, 14B show a metering pump 1 with an antibacterial insert. In other words, the pump housing of the metering pump has a bacteriostatic, bactericidal and/or fungicidal element 92 arranged in the fluid connection from the pump chamber 11 to the pump outlet 16.

The metering pump has a further non-return valve 35 in the fluid connection from the pump chamber 11 to the pump outlet 16. The further non-return valve 35 is an additional check valve connected in series with the outlet valve 34 in fluid communication. The further non-return valve 35 is of basically the same construction as the outlet valve 34.

Figure 15A:
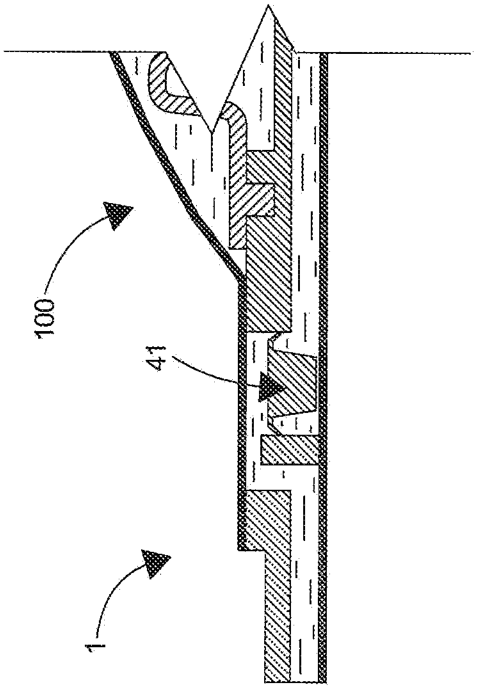
FIGS. 15A, 15B show a metering pump with a leak prevention device.
Figure 15B:
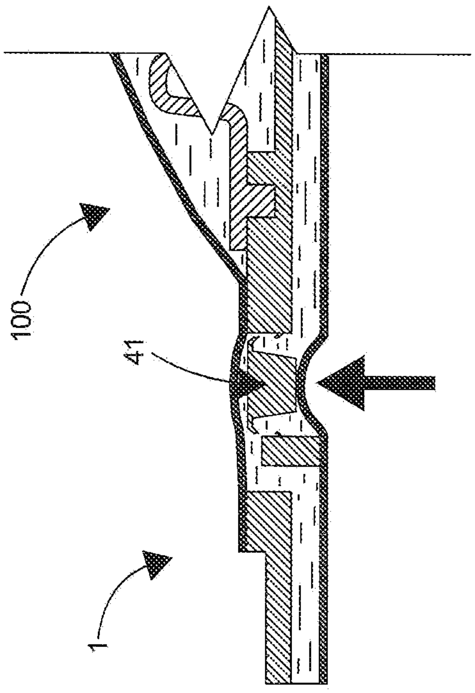

In FIGS. 15A, 15B, a metering pump is shown with a leakage prevention device 41. The leakage prevention device is arranged to seal a fluid connection between the pump chamber 11 and the pump outlet 16. In this regard, the leakage prevention device 41 is configured and positioned such that it can be removed, loosened, or mechanically destroyed by a user to release the fluid connection. In an illustrative embodiment, a plug is broken out of the outlet port 28 and remains in a position for fluid to flow past.

Figure 16A:
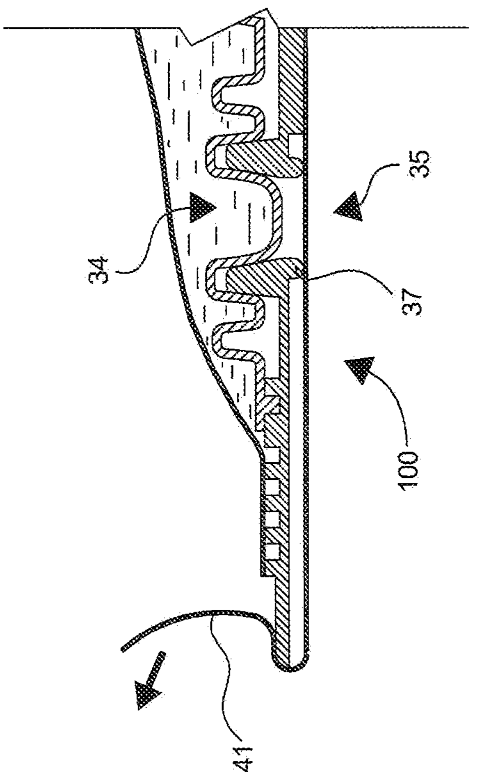
FIGS. 16A, 16B show another metering pump with a leak prevention device.
Figure 16B:
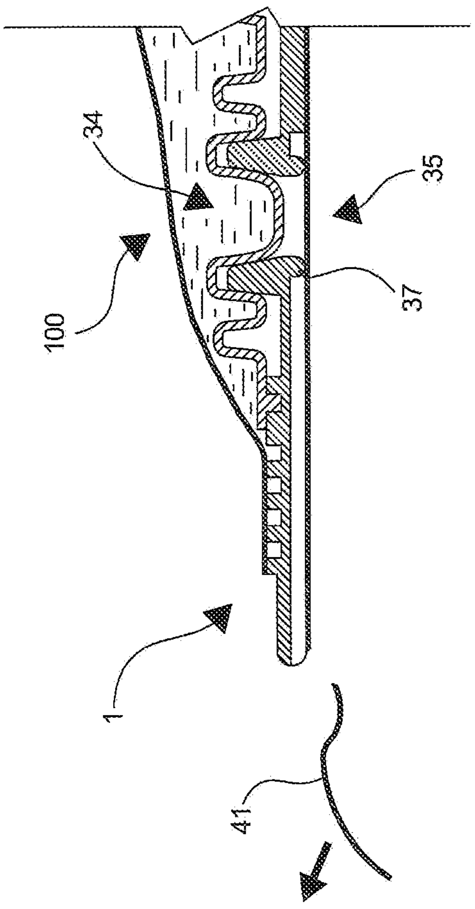

FIGS. 16A, 16B show another metering pump 1 with a leakage prevention device 41, in which a portion of the welded-on film is used to cover the pump outlet 16.

Figures 17A, 17B, 17C:
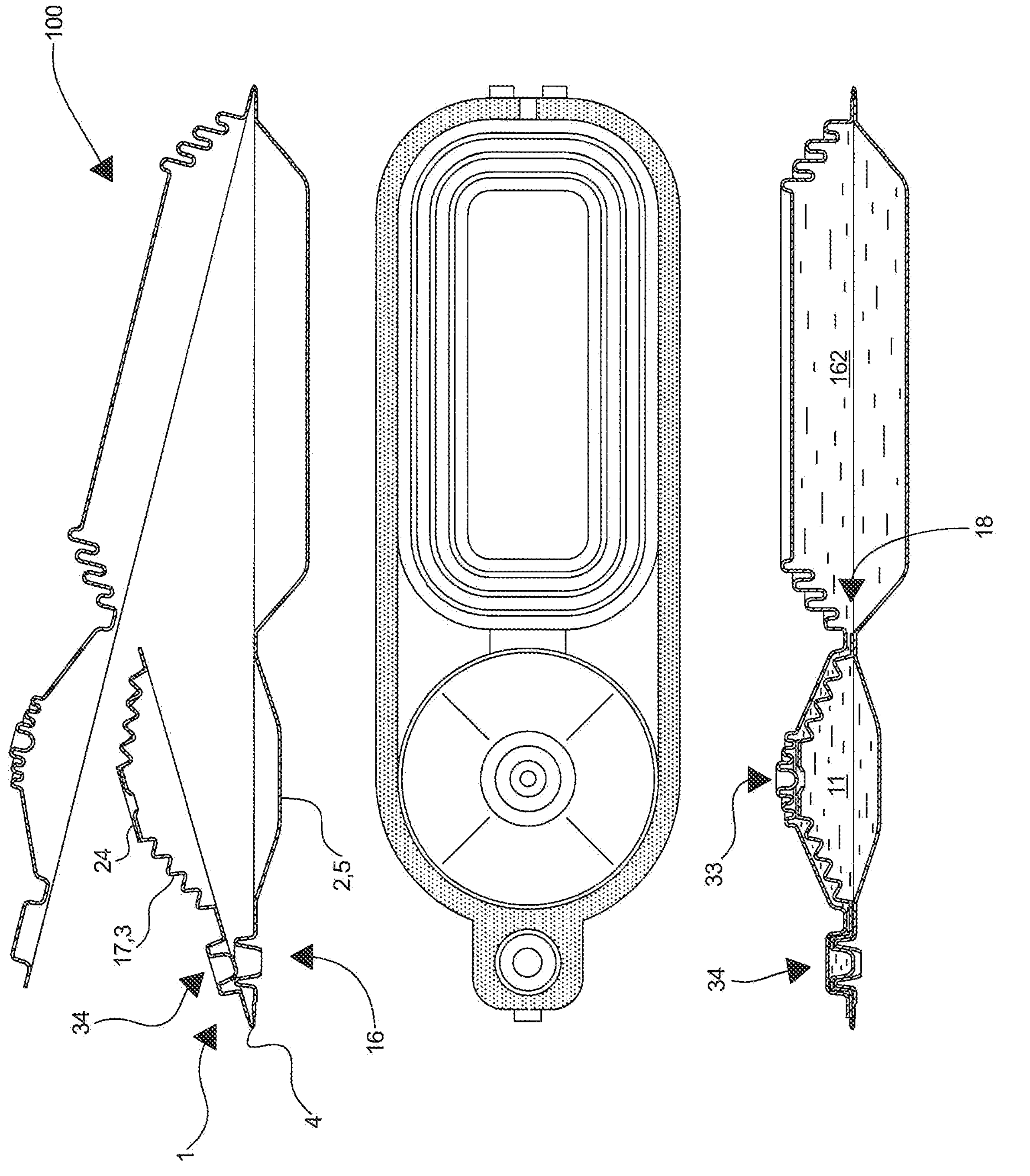
FIGS. 17A, 17B, 17C show a thin-walled container with another metering pump.

FIG. 17A, 17B, 17C show a thin-walled container with a further metering pump 1. Because of the higher material thickness of the container 100 and the resulting stiffness of the material, this variant should no longer be referred to as a film pouch.

Because of the higher stiffness, elastic areas are to be provided in the container in order to enable an air-free emptying of the container 100, accompanied by a volume reduction. Therefore, in one area of the container 100, a plurality of circumferential articulated corrugations are incorporated into the wall to provide sufficient displacement. Articulated corrugations may be distinguished from spring corrugations by a reduced cross-section of the material in the bending region and/or may be bistable.

The pump chamber base 5 can optionally have one or more stiffening beads.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

The invention claimed is:

1. A metering pump for integration into a container, the metering pump comprising:

- a pump housing defining a pump chamber and having a pump inlet and a pump outlet;
- wherein the pump chamber is defined by a pump chamber base and an elastically deformable pump dome;
- wherein the pump housing is composed of at least a first pump housing portion and a second pump housing portion, wherein the elastically deformable pump dome is a component of the first pump housing portion and the pump chamber base is a component of the second pump housing portion; and
- an outlet valve having an occlusion part and a sealing seat corresponding to the occlusion part, wherein the outlet valve is arranged in a fluid connection from the pump chamber to the pump outlet and is formed as a non-return valve, and wherein the occlusion part has a convex sealing surface and is supported in an outlet valve diaphragm.

2. The metering pump according to claim 1, wherein the first pump housing portion and the second pump housing portion together form a one-piece component and are connected by a film hinge.

3. The metering pump according to claim 1, wherein the occlusion part of the outlet valve comprises a circumferential spring corrugation and/or sealing corrugation.

4. The metering pump according to claim 1, wherein the outlet valve comprises an outlet valve opening with a circumferential outlet valve bead and an annular channel arranged outside the circumferential outlet valve bead.

5. The metering pump according to claim 1, comprising a further non-return valve in the fluid connection from the pump chamber to the pump outlet.

6. A metering pump for integration into a container, the metering pump comprising:
- a pump housing defining a pump chamber and having a pump inlet and a pump outlet;
- wherein the pump chamber is defined by a pump chamber base and an elastically deformable pump dome;
- wherein the pump housing is composed of at least a first pump housing portion and a second pump housing portion, wherein the elastically deformable pump dome is a component of the first pump housing portion and the pump chamber base is a component of the second pump housing portion; and
- wherein the pump inlet comprises a decompression crown, the decompression crown having a plurality of decompression teeth shaped and spaced apart annularly around the pump inlet such that two adjacent decompression teeth form a decompression channel.

7. The metering pump according to claim 1, wherein the elastically deformable pump dome comprises at least one circumferential spring corrugation.

8. The metering pump according to claim 1, wherein the pump housing comprises at least one groove configured and arranged to form, at least in sections, a fluid connection between the pump inlet and the pump chamber and/or between the pump chamber and the pump outlet.

9. The metering pump according to claim 1, wherein the pump housing comprises at least one fastening portion engaging a snap connection, and wherein the at least one fastening portion comprises an engagement edge, a latching tab, and/or a latching lug.

10. The metering pump according to claim 1, wherein the pump housing comprises at least a bacteriostatic, a bactericidal, and/or a fungicidal element arranged in a fluid connection from the pump chamber to the pump outlet.

11. The metering pump according to claim 1, comprising a leak prevention device, wherein the leak prevention device is adapted to seal a fluid connection between the pump chamber and the pump outlet, and wherein the leak prevention device is configured and arranged to be removed, released, or mechanically destroyed by a user to unseal the fluid connection.

12. A container comprising the metering pump according to claim 1, wherein the metering pump is arranged within the container and welded to the container, and wherein the container and the metering pump are comprised of the same or a similar thermoplastic material.

13. A product dispenser for receiving a container with the metering pump according to claim 1, wherein the product dispenser comprises holding elements for securing the container and a flexibly mounted push pin for manual actuation of the metering pump and/or an actuator seat for receiving a motor-driven actuator for automatic actuation of the metering pump.

14. A system comprising the container according to claim 12, and a product dispenser for receiving the container with the metering pump, wherein the product dispenser comprises holding elements for securing the container and a flexibly mounted push pin for manual actuation of the metering pump and/or an actuator seat for receiving a motor-driven actuator for automatic actuation of the metering pump.

15. The system according to claim 14, wherein said system comprises a motor driven actuator for the automatic actuation of the metering pump of the container.

16. The metering pump according to claim 2, wherein the one-piece component lacks undercuts in a defined direction for demolding.

17. The metering pump according to claim 1, wherein the occlusion part is an integral part of the first pump housing portion or the second pump housing portion and the sealing seat is an integral part of the other of the first pump housing portion and second pump housing portion.

18. The metering pump according to claim 3, wherein the sealing seat of the outlet valve comprises an annular ridge corresponding to the sealing corrugation and the annular ridge abuts the occlusion part in the sealing corrugation when the outlet valve is closed.

19. The metering pump according to claim 7, wherein the elastically deformable pump dome comprises a plurality of concentrically arranged spring corrugations.

20. A metering pump for integration into a container, the metering pump comprising:
- a pump housing defining a pump chamber and having a pump inlet and a pump outlet;
- wherein the pump chamber is defined by a pump chamber base and an elastically deformable pump dome;
- wherein the pump housing is composed of at least a first pump housing portion and a second pump housing portion, wherein the elastically deformable pump dome is a component of the first pump housing portion and the pump chamber base is a component of the second pump housing portion; and
- wherein the elastically deformable pump dome comprises a plurality of decompression teeth.

21. The metering pump according to claim 20, wherein the plurality of decompression teeth are arranged on the elastically deformable pump dome regularly spaced from each other.

22. The metering pump according to claim 20, wherein the pump housing comprises at least a bacteriostatic, a bactericidal, and/or a fungicidal element arranged in a fluid connection from the pump chamber to the pump outlet.

23. The metering pump according to claim 6, wherein the pump housing comprises at least a bacteriostatic, a bactericidal, and/or a fungicidal element arranged in a fluid connection from the pump chamber to the pump outlet.

* * * * *